United States Patent
Yamazaki et al.

(10) Patent No.: US 11,960,185 B2
(45) Date of Patent: Apr. 16, 2024

(54) DISPLAY DEVICE AND METHOD FOR DRIVING DISPLAY DEVICE

(71) Applicant: Semiconductor Energy Laboratory Co., Ltd., Kanagawa-ken (JP)

(72) Inventors: Shunpei Yamazaki, Tokyo (JP); Kouhei Toyotaka, Kanagawa (JP); Satoshi Yoshimoto, Kanagawa (JP); Kazunori Watanabe, Tokyo (JP); Susumu Kawashima, Kanagawa (JP); Kei Takahashi, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 682 days.

(21) Appl. No.: 17/041,599

(22) PCT Filed: Mar. 19, 2019

(86) PCT No.: PCT/IB2019/052193
§ 371 (c)(1),
(2) Date: Sep. 25, 2020

(87) PCT Pub. No.: WO2019/186320
PCT Pub. Date: Oct. 3, 2019

(65) Prior Publication Data
US 2023/0176433 A1   Jun. 8, 2023

(30) Foreign Application Priority Data
Mar. 30, 2018   (JP) .................................. 2018-067709

(51) Int. Cl.
G09G 3/30     (2006.01)
G02F 1/1362   (2006.01)
(Continued)

(52) U.S. Cl.
CPC ......... *G02F 1/136286* (2013.01); *G09G 3/32* (2013.01); *G09G 3/3648* (2013.01);
(Continued)

(58) Field of Classification Search
CPC .. G02F 1/136286; G09G 3/32; G09G 3/3648; G09G 2300/0842; G09G 2310/0205–021
See application file for complete search history.

(56) References Cited

U.S. PATENT DOCUMENTS 6,724,359 B2   4/2004 Yamamoto et al.
8,823,893 B2   9/2014 Yamazaki
(Continued)

FOREIGN PATENT DOCUMENTS

JP   09-080386 A     3/1997
JP   2002-277898 A   9/2002
(Continued)

OTHER PUBLICATIONS

International Search Report (Application No. PCT/IB2019/052193) dated Jun. 25, 2019.
(Continued)

*Primary Examiner* — Sanghyuk Park
(74) *Attorney, Agent, or Firm* — Husch Blackwell LLP

(57) ABSTRACT

Display data of pixels is updated at different timings. A scan line is connected to a first pixel and a second pixel, a first wiring is connected to the first pixel, and a second wiring is connected to the second pixel. In a first period, a signal for selecting the first pixel and the second pixel is supplied to the scan line. Setting data for setting a state where the display data of the first pixel is updated is supplied to the first wiring, and setting data for setting a state where the display data of the second pixel is updated is supplied to the second wiring. In a second period, a signal for selecting the first pixel and the second pixel is supplied to the scan line.
(Continued)

Setting data for setting a state where the display data of the first pixel is not updated is supplied to the first wiring, and the setting data for setting the state where the display data of the second pixel is updated is supplied to the second wiring. In a third period, the first pixel displays first display data, and the second pixel displays second display data.

8 Claims, 17 Drawing Sheets

(51) Int. Cl.
*G09G 3/12* (2006.01)
*G09G 3/32* (2016.01)
*G09G 3/36* (2006.01)
*G02F 1/1368* (2006.01)

(52) U.S. Cl.
CPC ... *G02F 1/1368* (2013.01); *G09G 2300/0842* (2013.01); *G09G 2310/0202* (2013.01); *G09G 2310/04* (2013.01); *G09G 2320/103* (2013.01); *G09G 2330/021* (2013.01)

(56) References Cited

U.S. PATENT DOCUMENTS

| | | | |
|---|---|---|---|
| 8,854,286 B2 | 10/2014 | Yamazaki et al. | |
| 10,002,972 B2 | 6/2018 | Miyake | |
| 2004/0095305 A1* | 5/2004 | Kimura | G09G 3/20 345/92 |
| 2005/0259703 A1* | 11/2005 | You | G09G 3/3233 372/38.07 |
| 2006/0022305 A1 | 2/2006 | Yamashita | |
| 2007/0236440 A1 | 10/2007 | Wacyk et al. | |
| 2009/0219238 A1* | 9/2009 | Furuya | G09G 3/3677 345/87 |
| 2010/0001937 A1* | 1/2010 | Yen | G09G 3/3659 345/55 |
| 2013/0057565 A1* | 3/2013 | Choi | G09G 3/2096 345/547 |
| 2014/0092333 A1* | 4/2014 | Li | H01L 27/12 257/59 |
| 2014/0160103 A1* | 6/2014 | Lu | G09G 3/3659 345/212 |
| 2016/0189604 A1* | 6/2016 | Hu | G09G 3/3225 345/215 |
| 2017/0263184 A1* | 9/2017 | Chen | G09G 3/3291 |
| 2018/0025690 A1* | 1/2018 | Bao | G09G 3/3258 345/691 |

FOREIGN PATENT DOCUMENTS

| | | |
|---|---|---|
| JP | 2006-309104 A | 11/2006 |
| JP | 2011-141522 A | 7/2011 |
| JP | 2011-237760 A | 11/2011 |
| JP | 2017-010000 A | 1/2017 |
| WO | WO 1998/002773 A1 | 1/1998 |

OTHER PUBLICATIONS

Written Opinion (Application No. PCT/IB2019/052193) dated Jun. 25, 2019.

Yamazaki, S. et al., "Research, Development, and Application of Crystalline Oxide Semiconductor," SID Digest '12: SID International Symposium Digest of Technical Papers, Jun. 5, 2012, vol. 43, No. 1, pp. 183-186.

Yamazaki, S. et al., "Properties of Crystalline In—Ga—Zn-oxide Semiconductor and its Transistor Characteristics," Japanese Journal of Applied Physics, Mar. 31, 2014, vol. 53, No. 4S, pp. 04ED18-1-04ED18-10.

Ito, S. et al., "Analysis of Nanoscale Crystalline Structure of In—Ga—Zn—O Thin Film with Nano Beam Electron Diffraction," AM-FPD '13 Digest of Technical Papers, Jul. 2, 2013, pp. 151-154.

Yamazaki, S. et al., "In—Ga—Zn-Oxide Semiconductor and Its Transistor Characteristics," ECS Journal of Solid State Science and Technology, Jul. 1, 2014, vol. 3, No. 9, pp. Q3012-Q3022.

Yamazaki, S., "Crystalline Oxide Semiconductor Using CAAC-IGZO and its Application," ECS Transactions, Oct. 1, 2014, vol. 64, No. 10, pp. 155-164, The Electrochemical Society.

Kato, K. et al., "Evaluation of Off-State Current Characteristics of Transistor Using Oxide Semiconductor Material, Indium-Gallium-Zinc Oxide," Japanese Journal of Applied Physics, 2012, vol. 51, pp. 021201-1-021201-7.

Matsuda, S. et al., "30-nm-Channel-Length C-Axis Aligned Crystalline In—Ga—Zn—O Transistors with Low Off-State Leakage Current and Steep Subthreshold Characteristics," 2015 Symposium on VLSI Technology: Digest of Technical Papers, 2015, pp. T216-T217.

Amano, S. et al., "Low Power LC Display Using In—Ga—Zn-Oxide TFTs Based on Variable Frame Frequency," SID Digest '10: SID International Symposium Digest of Technical Papers, May 23, 2010, vol. 41, No. 1, pp. 626-629.

* cited by examiner

FIG. 2A1
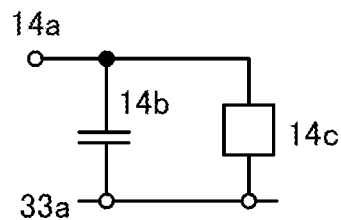
FIG. 2A2
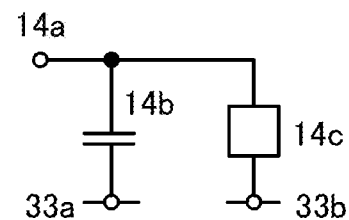
FIG. 2B1
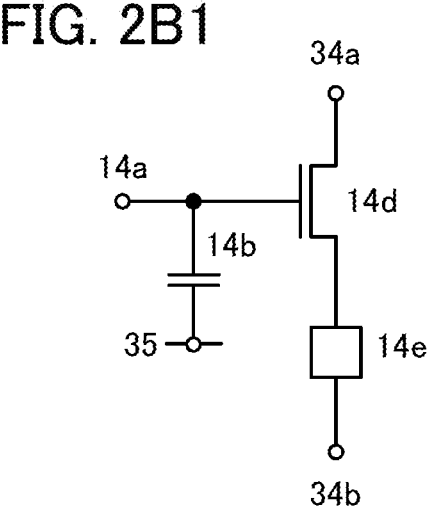
FIG. 2B2
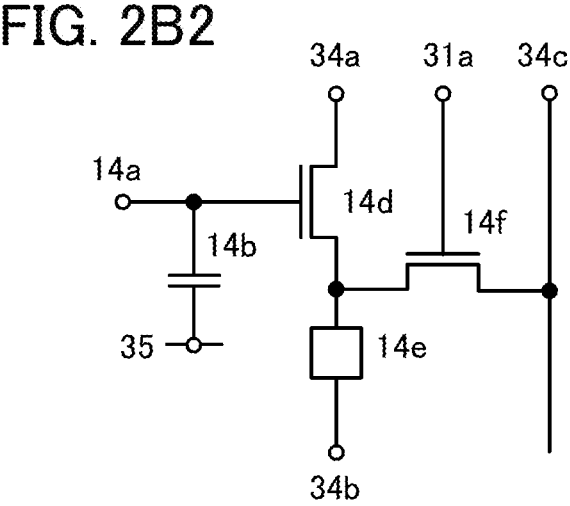

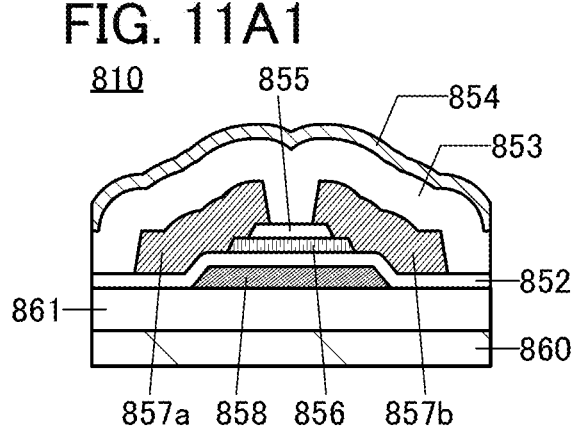
FIG. 11A1
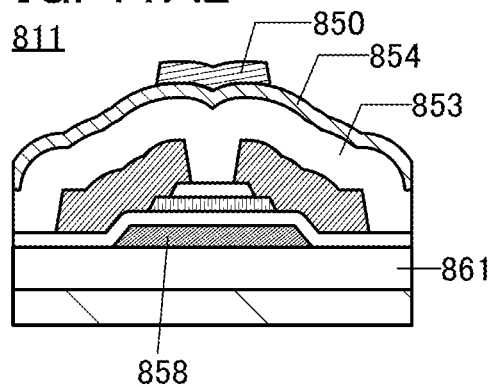
FIG. 11A2
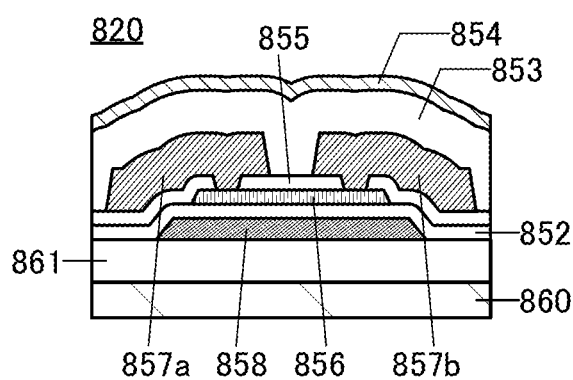
FIG. 11B1
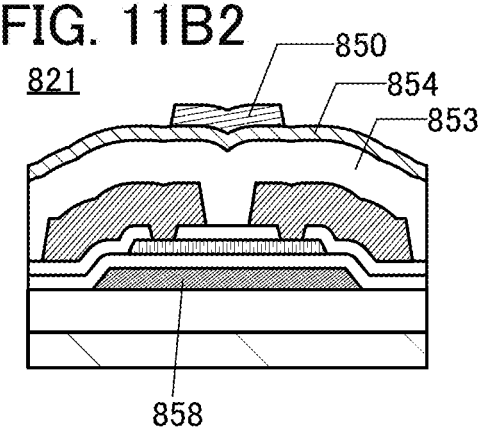
FIG. 11B2
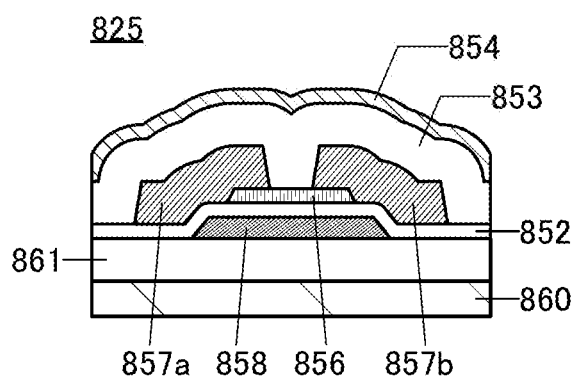
FIG. 11C1
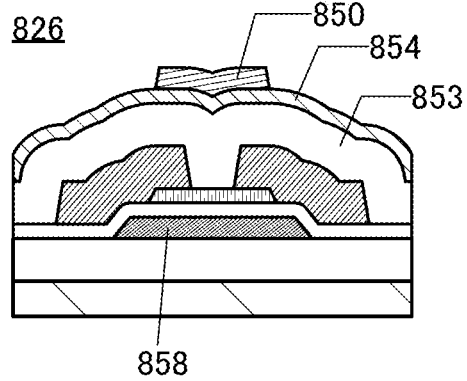
FIG. 11C2

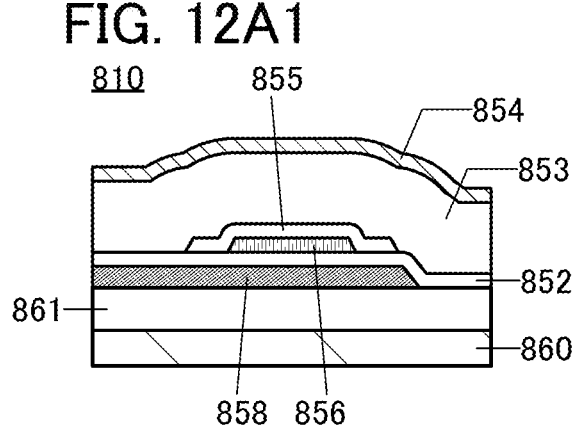
FIG. 12A1
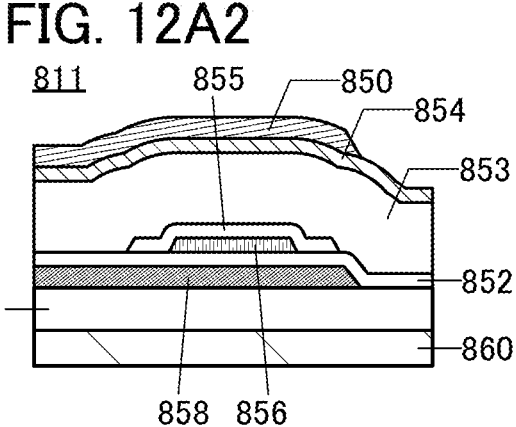
FIG. 12A2
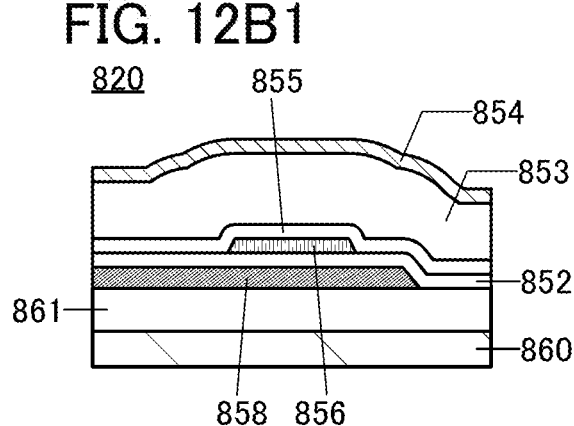
FIG. 12B1
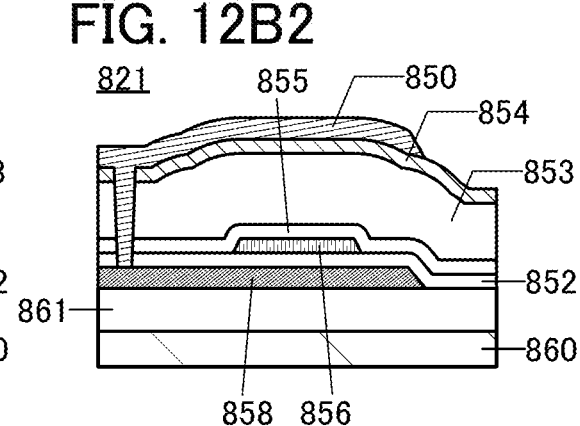
FIG. 12B2
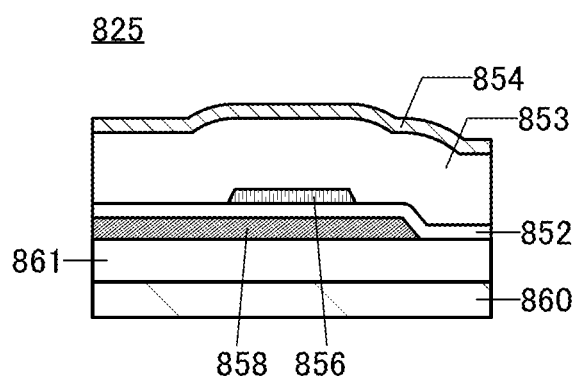
FIG. 12C1
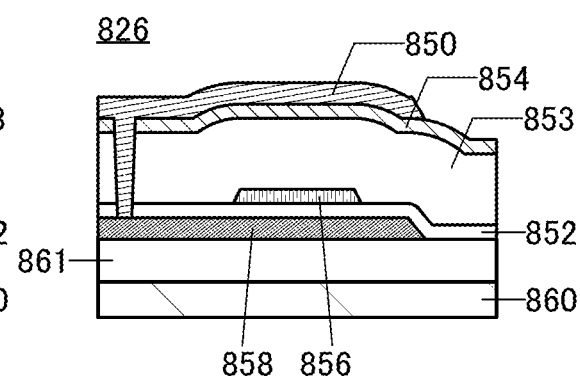
FIG. 12C2

FIG. 13A1
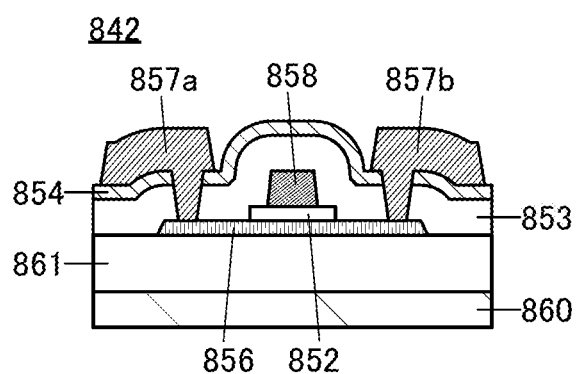
FIG. 13A2
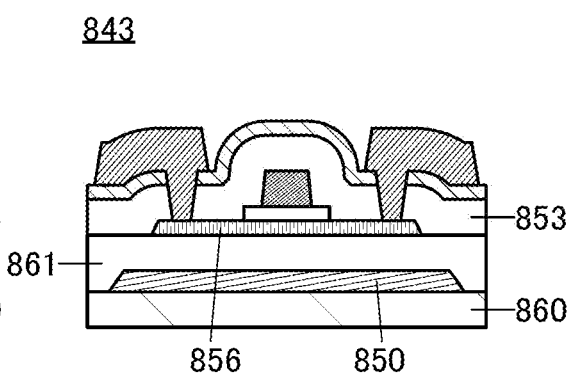
FIG. 13B1
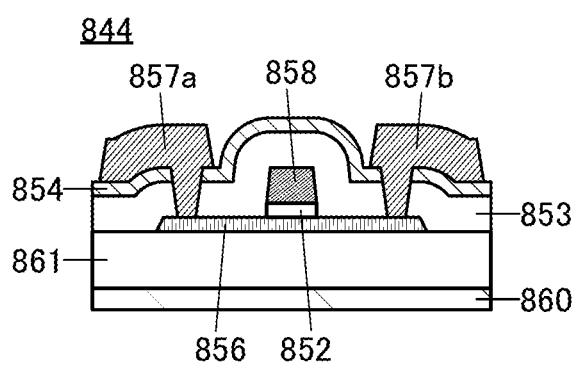
FIG. 13B2
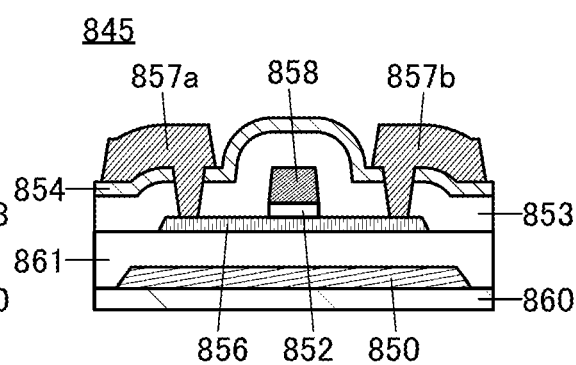
FIG. 13C1
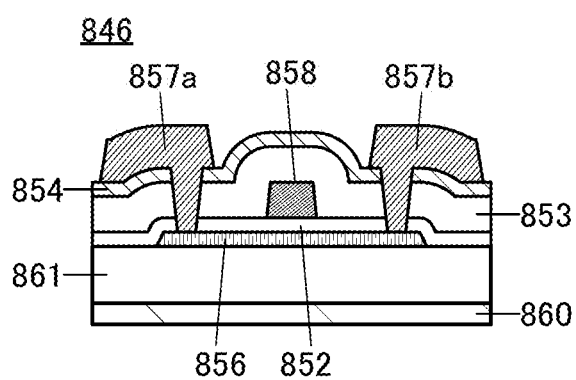
FIG. 13C2
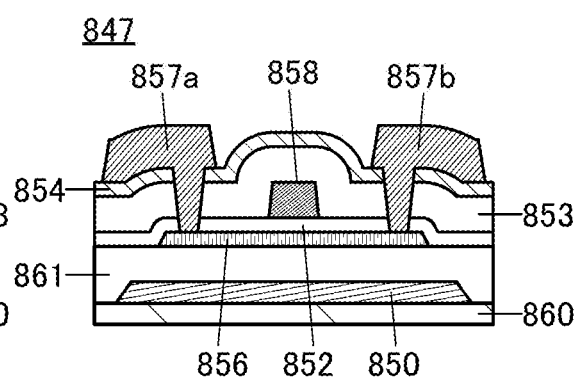

FIG. 14A1
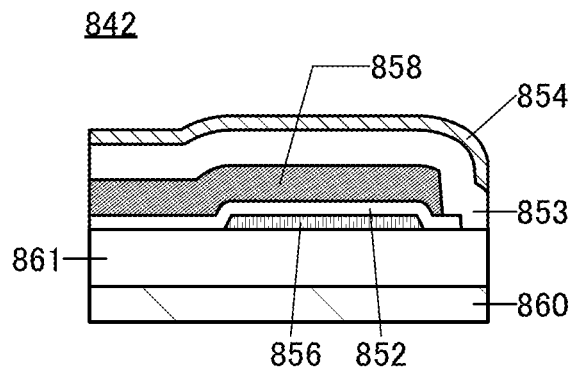
FIG. 14A2
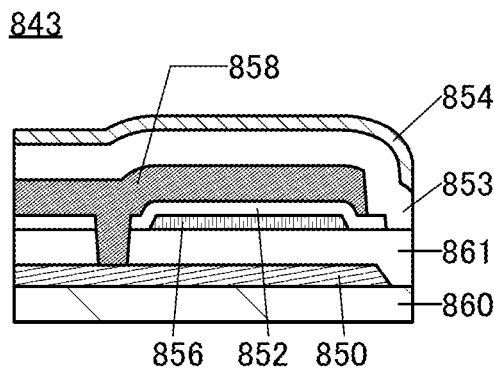
FIG. 14B1
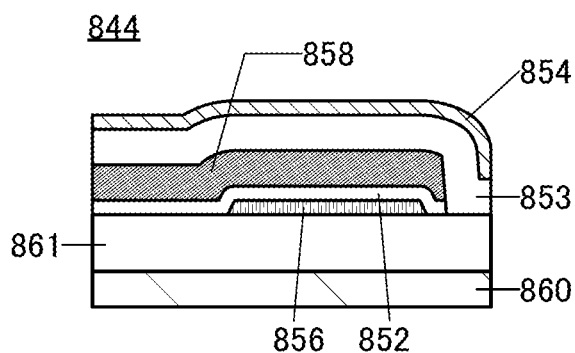
FIG. 14B2
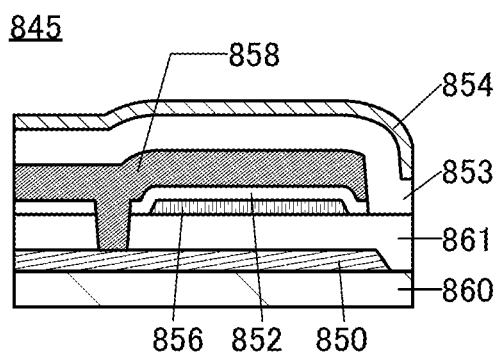
FIG. 14C1
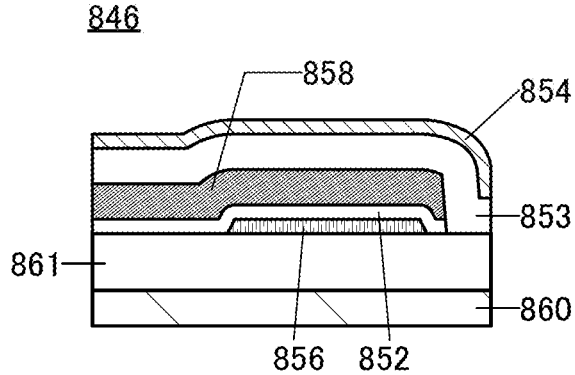
FIG. 14C2
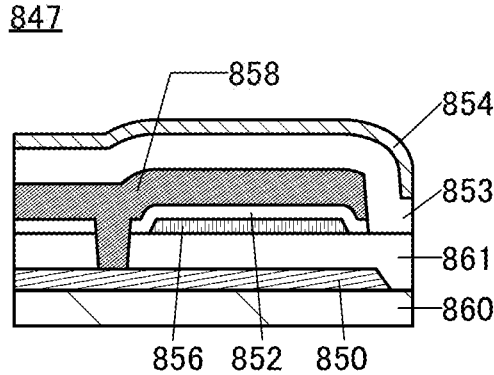

9100

9200

9101

9201

9102

9201

9201

DISPLAY DEVICE AND METHOD FOR DRIVING DISPLAY DEVICE

This application is a 371 of international application PCT/IB2019/052193 filed on Mar. 19, 2019 which is incorporated herein by reference.

TECHNICAL FIELD

One embodiment of the present invention relates to a display device and a driving method of the display device.

Furthermore, one embodiment of the present invention relates to an object, a method, or a manufacturing method. Alternatively, one embodiment of the present invention relates to a process, a machine, manufacture, or a composition of matter. One embodiment of the present invention relates to a driving method thereof or a manufacturing method thereof.

In this specification and the like, a semiconductor device generally means a device that can function by utilizing semiconductor characteristics. A memory device, a display device, an electro-optical device, a power storage device, a semiconductor circuit, and an electronic device include a semiconductor device in some cases.

BACKGROUND ART

Low power consumption is an added value required for a display device. For example, Patent Document 1 and Patent Document 2 disclose that power consumption is reduced by the extension of an interval between data writing operations in a period during which a still image is displayed.

A silicon-based semiconductor material is widely known as a semiconductor thin film that can be used in a transistor used for a display device; in addition, an oxide semiconductor has been attracting attention as another material. In particular, an In—Ga—Zn oxide (hereinafter, also referred to as IGZO) has been actively studied.

From the studies on IGZO, a CAAC (c-axis aligned crystalline) structure and an nc (nanocrystalline) structure, which are not single crystal nor amorphous, have been found in an oxide semiconductor (see Non-Patent Document 1 to Non-Patent Document 3). Non-Patent Document 1 and Non-Patent Document 2 also disclose a technique for fabricating a transistor using an oxide semiconductor having a CAAC structure. Moreover, Non-Patent Document 4 and Non-Patent Document 5 show that a fine crystal is included even in an oxide semiconductor which has lower crystallinity than the CAAC structure or the nc structure.

In addition, a transistor that uses IGZO for an active layer has an extremely low off-state current (see Non-Patent Document 6), and an LSI and a display utilizing the characteristics have been reported (see Non-Patent Document 7 and Non-Patent Document 8).

REFERENCES

Patent Documents

[Patent Document 1] Japanese Published Patent Application No. 2011-141522
[Patent Document 2] Japanese Published Patent Application No. 2011-237760

Non-Patent Documents

[Non-Patent Document 1] S. Yamazaki et al., "SID Symposium Digest of Technical Papers", 2012, volume 43, issue 1, p. 183-186
[Non-Patent Document 2] S. Yamazaki et al., "Japanese Journal of Applied Physics", 2014, volume 53, Number 4S, p. 04ED18-1-04ED18-10
[Non-Patent Document 3] S. Ito et al., "The Proceedings of AM-FPD '13 Digest of Technical Papers", 2013, p. 151-154
[Non-Patent Document 4] S. Yamazaki et al., "ECS Journal of Solid State Science and Technology", 2014, volume 3, issue 9, p. Q3012-Q3022
[Non-Patent Document 5] S. Yamazaki, "ECS Transactions", 2014, volume 64, issue 10, p. 155-164
[Non-Patent Document 6] K. Kato et al., "Japanese Journal of Applied Physics", 2012, volume 51, p. 021201-1-021201-7
[Non-Patent Document 7] S. Matsuda et al., "2015 Symposium on VLSI Technology Digest of Technical Papers", 2015, p. T216-T217
[Non-Patent Document 8] S. Amano et al., "SID Symposium Digest of Technical Papers", 2010, volume 41, issue 1, p. 626-629

SUMMARY OF THE INVENTION

Problems to be Solved by the Invention

An object of one embodiment of the present invention is to provide a novel display device. Another object of one embodiment of the present invention is to provide a method for driving a novel display device. Another object of one embodiment of the present invention is to provide a display device with reduced power consumption.

Note that the description of a plurality of objects does not preclude the existence of each object. One embodiment of the present invention does not necessarily achieve all of these objects. Objects other than those listed above will be apparent from the description of the specification, the drawings, the claims, and the like, and such objects could be objects of one embodiment of the present invention.

Means for Solving the Problems

One embodiment of the present invention is a method for driving a display device including a first pixel, a second pixel, a scan line, a first wiring, and a second wiring. Different display data can be supplied to the first pixel and the second pixel. Setting data supplied to the first pixel and the second pixel can set a state where the display data of the first pixel and the second pixel is updated or a state where the display data is not updated. The scan line is electrically connected to the first pixel and the second pixel. The first wiring is electrically connected to the first pixel, and the second wiring is electrically connected to the second pixel. The driving method of one embodiment of the present invention includes a first period to a third period, and in the first period, a signal for selecting the first pixel and the second pixel is supplied to the scan line. The setting data for setting the state where the display data of the first pixel is updated is supplied to the first wiring, and the setting data for setting the state where the display data of the second pixel is updated is supplied to the second wiring. In the second period, a signal for selecting the first pixel and the second pixel is supplied to the scan line. The setting data for setting the state where the display data of the first pixel is not updated is supplied to the first wiring, and the setting data for setting the state where the display data of the second pixel is updated is supplied to the second wiring. In the third period, a signal for deselecting the first pixel and the second pixel is supplied to the scan line. First display data is displayed in the first pixel, and second display data is displayed in the second pixel.

In the method for driving a display device in the above embodiment, it is preferable that the pixel include a capacitor for holding the setting data and a transistor; the setting data supplied to the capacitor have a function of setting the state where the display data of the pixel is updated or the state where the display data of the pixel is not updated; the setting data supplied to the capacitor control an on/off state of the transistor; the display data be updated through the transistor when the setting data for setting the state where the display data is updated is supplied to the capacitor; and the display data not be updated through the transistor when the setting data for setting the state where the display data is not updated is supplied to the capacitor.

One embodiment of the present invention is a display device including a plurality of pixels, a plurality of scan lines, and a plurality of signal lines. The signal lines each include a first wiring and a second wiring, and the scan lines each include a third wiring and a fourth wiring. The pixels each include a first transistor, a second transistor, a third transistor, a first capacitor, and a first circuit. The first circuit includes an input terminal. A gate of the first transistor is electrically connected to the third wiring. One of a source and a drain of the first transistor is electrically connected to the first wiring. The other of the source and the drain of the first transistor is electrically connected to one of a source and a drain of the second transistor. The other of the source and the drain of the second transistor is electrically connected to the input terminal. One of a source and a drain of the third transistor is electrically connected to the second wiring. The other of the source and the drain of the third transistor is electrically connected to a gate of the second transistor and one electrode of the first capacitor. A gate of the third transistor is electrically connected to the fourth wiring.

In the above embodiment, the first circuit includes a second capacitor and a liquid crystal element. In the display device, it is preferable that the input terminal of the first circuit be electrically connected to one electrode of the second capacitor and the liquid crystal element.

In the above embodiment, the first circuit includes a third capacitor, a fourth transistor, and a light-emitting element. The input terminal of the first circuit is electrically connected to one electrode of the third capacitor and a gate of the fourth transistor. In the display device, it is preferable that one of a source and a drain of the fourth transistor be electrically connected to the light-emitting element.

One embodiment of the present invention is the display device in any of the above embodiments that includes a source driver. The source driver is electrically connected to the plurality of signal lines. The source driver has a function of selecting whether the first wiring is supplied with the display data or brought into a floating state. The source driver has a function of supplying the setting data to the second wiring. In the display device, it is preferable that the source driver be capable of supplying the display data to the plurality of signal lines at the same time.

Effect of the Invention

According to one embodiment of the present invention, a novel display device can be provided. According to one embodiment of the present invention, a method for driving a novel display device can be provided. According to one embodiment of the present invention, a display device with reduced power consumption can be provided.

Note that the description of these effects does not preclude the existence of other effects. One embodiment of the present invention does not have to have all of these effects. Other effects will be apparent from the description of the specification, the drawings, the claims, and the like, and other effects can be derived from the description of the specification, the drawings, the claims, and the like.

BRIEF DESCRIPTION OF THE DRAWINGS

FIGS. 2A1-2B2 are circuit diagrams illustrating structure examples of a display device.

FIGS. 11A1-11C2 are cross-sectional views illustrating structure examples of transistors.

FIGS. 12A1-12C2 are cross-sectional views illustrating structure examples of transistors.

FIGS. 13A1-13C2 are cross-sectional views illustrating structure examples of transistors.

FIGS. 14A1-14C2 are cross-sectional views illustrating structure examples of transistors.

MODE FOR CARRYING OUT THE INVENTION

Figure 1:
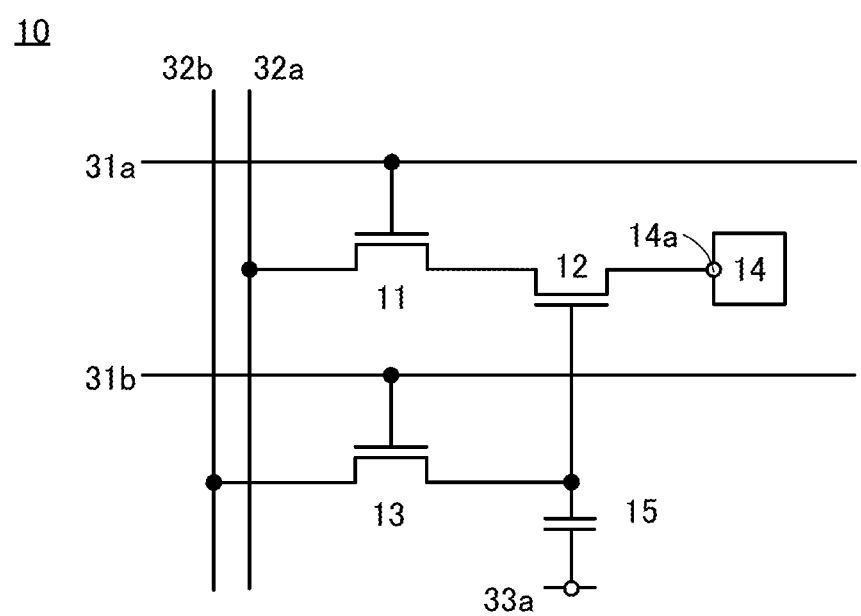
FIG. 1 is a circuit diagram illustrating a structure example of a display device.

Embodiments of the present invention will be described in detail with reference to the drawings. Note that the present invention is not limited to the following description, and it will be readily appreciated by those skilled in the art that modes and details of the present invention can be modified in various ways without departing from the spirit and scope of the present invention. Thus, the present invention should not be construed as being limited to the description in the following embodiments and example.

Note that in structures of the invention described below, the same portions or portions having similar functions are denoted by the same reference numerals in different drawings, and explanation thereof is omitted. Furthermore, the same hatching pattern is used for portions having similar functions, and the portions are not especially denoted by reference numerals in some cases.

Note that in each drawing described in this specification, the size, the layer thickness, or the region of each component is exaggerated for clarity in some cases. Therefore, they are not limited to the illustrated scale.

Note that in this specification, a high power supply voltage and a low power supply voltage are sometimes referred to as an H level (or $V_{DD}$) and an L level (or GND), respectively.

In this specification, the embodiments and the example described below can be combined as appropriate. In the case where a plurality of structure examples are described in one embodiment, the structure examples can be combined as appropriate.

In this specification and the like, a metal oxide is an oxide of metal in a broad sense. Metal oxides are classified into an oxide insulator, an oxide conductor (including a transparent oxide conductor), an oxide semiconductor, and the like. For example, in the case where a metal oxide is used in a semiconductor layer of a transistor, the metal oxide is referred to as an oxide semiconductor in some cases. In the case where an OS transistor is mentioned, the OS transistor can also be referred to as a transistor including a metal oxide or an oxide semiconductor. In this specification and the like, a metal oxide containing nitrogen is also referred to as a metal oxide in some cases.

Embodiment 1

Two major driving methods of a display device including a plurality of pixels have been known. One is a general driving method for displaying a still image or a moving image, in which display data is rewritten every frame. This is called "normal driving". The other is a driving method in which display data rewriting is stopped after display data writing processing is executed. This is called "idling stop (IDS) driving". This driving method is mainly used for displaying a still image.

The IDS driving is a driving method in which the frequency of rewriting display data is lower than that in the normal driving. For example, in the IDS driving, the frequency of rewriting display data is controlled every frame. For example, in an electronic device including a display device, a display region of the display device can be roughly divided into two display regions to be separately controlled. A first display region is used for displaying a still image or the like, and a second display region is used for displaying a moving image, an editing screen for a moving image, or the like. Note that the sizes, the positions, and the like of the first display region and the second display region are not fixed, and can be changed depending on the displayed content. This embodiment describes a pixel in which display data rewriting of the first display region or the second display region can be easily controlled.

A display device includes a source driver, a gate driver, a plurality of pixels, and a plurality of wirings. The plurality of wirings include a plurality of scan lines to which scan signals are supplied and a plurality of signal lines to which display data is supplied. The scan lines are each electrically connected to a plurality of pixels. The pixels can each be in two states: a state where display data is updated and a state where display data is not updated. These states can be controlled by setting data supplied to the pixels. The setting data refers to data for setting the state where display data is updated or the state where display data is not updated, and is supplied as a binary voltage of "H" or "L". Note that the source driver can supply the display data and the setting data to the pixels.

For example, a first pixel and a second pixel electrically connected to the same scan line are described. Hereinafter, a driving method of the case where the first pixel is in the state where display data is not updated and the second pixel is in the state where display data is updated is described. Here, display data supplied in a first period is referred to as first display data, and display data supplied in a second period is referred to as second display data. Note that data supplied to the first pixel and the second pixel may be data including different gray levels or data including the same gray level.

First, in the first period, the setting data for setting the state where display data is updated is supplied to each of the first pixel and the second pixel, and then the first display data is supplied to each pixel. Next, in the second period, the setting data for setting the state where display data is not updated is supplied to the first pixel and the setting data for setting the state where display data is updated is supplied to the second pixel first, and then the second display data is supplied to the second pixel, whereby the display data in the second pixel is updated. Next, in a third period, a signal for deselecting the first pixel and the second pixel is supplied to the scan line. Thus, in the third period, the first pixel displays the first display data, and the second pixel displays the second display data.

For example, the setting data for setting the state where display data is not updated is supplied to a pixel displaying a still image, and the setting data for setting the state where display data is updated is supplied to a pixel displaying a moving image or the like. Note that when the first display data (a still image) or the second display data (a moving image) is not specified, the display data includes one or both of the first display data and the second display data.

The setting data is preferably supplied to the pixels at a given timing. Thus, the display device can display the display data updated at different timings in the pixels. Note that in the plurality of pixels connected to the scan lines to which the scan signals are supplied, a pixel in which display data is updated and a pixel in which display data is not updated and the previous display data keeps being held may be mixed.

Note that the electronic device including the display device is preferably used for a smartphone, a tablet, an electronic book, a laptop computer, a monitor, digital signage, or the like, and can be used for a watch, a video camera, a game machine, a TV, or the like. The frequency of updating the display data can be low in the first display region displaying a still image or the like, thereby reducing the power consumption of the source driver that controls the display data through the signal lines. The details of the electronic device are described in Embodiment 3 or Embodiment 4.

<<Pixel>>

FIG. 1 is a circuit diagram illustrating a structure example of a display device. For example, the display device includes a pixel and a plurality of wirings. A pixel 10 includes a transistor 11, a transistor 12, a transistor 13, a circuit 14, and a capacitor 15. Note that the circuit 14 includes an input terminal 14a. The display device also includes a wiring 31 (a wiring 31a and a wiring 31b) serving as a scan line to which a scan signal is supplied from a gate driver (not illustrated). Note that the wiring 31a and the wiring 31b serve as the scan lines to which different scan signals are supplied. The display device also includes a wiring 32 (a wiring 32a and a wiring 32b) serving as a signal line to which a data signal is supplied from a source driver. The wiring 32a is supplied with display data, and the wiring 32b is supplied with setting data. A fixed potential is supplied to a wiring 33a. The data signal in the following description includes one or both of the display data and the setting data.

The circuit 14 preferably includes a liquid crystal element, an EL (Electroluminescence) element, or an LED (Light Emitting Diode). The circuit 14 is described in detail in FIG. 2.

Next, electrical connections in the pixel 10 are described. A gate of the transistor 11 is electrically connected to the wiring 31a. One of a source and a drain of the transistor 11 is electrically connected to the wiring 32a. The other of the source and the drain of the transistor 11 is electrically connected to one of a source and a drain of the transistor 12. The other of the source and the drain of the transistor 12 is electrically connected to the input terminal 14a of the circuit 14. One of a source and a drain of the transistor 13 is electrically connected to the wiring 32b. The other of the source and the drain of the transistor 13 is electrically connected to a gate of the transistor 12 and one electrode of the capacitor 15. A gate of the transistor 13 is electrically connected to the wiring 31b.

The setting data for setting a state where display data of the circuit 14 is updated or a state where display data of the circuit 14 is not updated can be supplied to the capacitor 15. Thus, the setting data supplied to the capacitor 15 through the transistor 13 controls the transistor 12. When the setting data for setting the state where display data is updated is supplied to the capacitor 15, the transistor 12 is brought into the on state and the display data is supplied to the circuit 14 through the transistor 11. When the setting data for setting the state where display data is not updated is supplied to the capacitor 15, the display data of the circuit 14 is not updated because the transistor 12 is in the off state. That is, the setting data supplied to the pixel can set the state where display data is updated or the state where display data is not updated.

Note that in order to bring the transistor 12 into the on state, the setting data supplied to the capacitor 15 is preferably a voltage higher than the voltage range of the display data supplied to the circuit 14. The setting data is further preferably a voltage higher than a voltage obtained by adding the threshold voltage of the transistor 12 to the voltage range of the display data.

Alternatively, the setting data supplied to the capacitor 15 is preferably a voltage lower than the voltage range of the display data supplied to the circuit 14. The setting data is further preferably a voltage lower than a voltage obtained by subtracting the threshold value of the transistor 12 from the voltage range of the display data.

Note that there is no particular limitation on a semiconductor layer used for the transistor 11 to the transistor 13, and an amorphous semiconductor or a semiconductor having crystallinity (a microcrystalline semiconductor, a polycrystalline semiconductor, a single crystal semiconductor, or a semiconductor partly including crystal regions) may be used. A semiconductor having crystallinity is preferably used, in which case deterioration of the transistor characteristics can be suppressed.

Silicon can be used as a semiconductor in which a channel of the transistor is formed, for example. Amorphous silicon may be used as silicon. In the case of using amorphous silicon, transistors can be formed over a large substrate with a high yield, resulting in excellent mass productivity.

Alternatively, silicon having crystallinity, such as microcrystalline silicon, polycrystalline silicon, or single crystal silicon, may be used. In particular, polycrystalline silicon can be formed at a temperature lower than that for single crystal silicon and has higher field-effect mobility and higher reliability than amorphous silicon.

Alternatively, a metal oxide may be used in a semiconductor layer of a transistor. A transistor including a metal oxide in a semiconductor layer is known to have a low off-state current. The use of a transistor with a low off-state current as the transistor 11 to the transistor 13 serving as selection transistors in the pixel can inhibit deterioration of display quality even when the interval between the updating operations of the display data is made longer. Accordingly, the number of times of updating the display can be reduced when a still image is displayed, which can decrease power consumption.

Furthermore, the transistor with a low off-state current can be rephrased as a transistor having a high insulating property between its source and drain in the off state. Thus, the influence of the data signal supplied to the wiring 32a or the wiring 32b on the circuit 14 is reduced. Accordingly, the transistor including a metal oxide in the semiconductor layer is further preferably used as the transistor 11 to the transistor 13. The transistor including a metal oxide in the semiconductor layer is described in detail in Embodiment 5.

FIG. 2 illustrates structure examples of the circuit 14. The circuit 14 illustrated in FIG. 2(A-1) includes the input terminal 14a, a capacitor 14b, a liquid crystal element 14c, and the wiring 33a. The circuit 14 illustrated in FIG. 2(A-2) is different from the circuit 14 illustrated in FIG. 2(A-1) in including a wiring 33b. The input terminal 14a is electrically connected to one electrode of the capacitor 14b and one electrode of the liquid crystal element 14c. In the circuit 14 illustrated in FIG. 2(A-1), the other electrode of the capacitor 14b and the other electrode of the liquid crystal element 14c are electrically connected to the wiring 33a. The circuit 14 illustrated in FIG. 2(A-2) is different from the circuit 14 illustrated in FIG. 2(A-1) in that the other electrode of the liquid crystal element 14c is electrically connected to the wiring 33b.

In the circuit 14 illustrated in FIG. 2(A-1), a fixed potential is preferably supplied to the wiring 33a but the potential to be supplied may differ between display frames or gate lines. For example, inverting the direction of an electric field applied to the liquid crystal element 14c produces an effect of reducing burn-in of the liquid crystal element 14c.

In the circuit 14 illustrated in FIG. 2(A-2), different fixed potentials are preferably supplied to the wiring 33a and the wiring 33b, for example. Note that the potential supplied to the wiring 33b may differ between display frames or gate lines. When the capacitor 14b holds the display data with the use of a fixed potential different from that of the liquid crystal element 14c as a reference, a potential different from the display data can be supplied to the liquid crystal element 14c. In the case where the temperature characteristics of the transistor used in the pixel are different from the temperature characteristics of the liquid crystal element 14c, the adjustment of the levels of the fixed potentials is suitable for adjusting the temperature characteristics.

The capacitor 14b is not necessarily provided in the circuit 14 illustrated in FIG. 2(A-2). The capacitance may be formed using the electrodes of the liquid crystal element 14c. A method for driving the liquid crystal element 14c by forming the capacitance using the electrodes of the liquid crystal element 14c is referred to as an FFS (Fringe Field Switching) mode.

Note that in this specification, display devices in each of which the circuit 14 includes the liquid crystal element 14c are classified into a direct-view type, a projection type, and the like depending on a method for displaying an image. Moreover, the display devices can be classified into a transmissive type, a reflective type, and a transflective type according to whether a pixel transmits or reflects illumination light. As an example of the liquid crystal element 14c, an element that controls the transmission or non-transmission of light utilizing an optical modulation action of a liquid crystal is given. The element can include a pair of electrodes and a liquid crystal layer. Note that the optical modulation action of the liquid crystal is controlled by an electric field applied to the liquid crystal (including a horizontal electric field, a vertical electric field, or an oblique electric field). Examples of a liquid crystal used for the liquid crystal element include a nematic liquid crystal, a cholesteric liquid crystal, a smectic liquid crystal, a discotic liquid crystal, a thermotropic liquid crystal, a lyotropic liquid crystal, a low-molecular liquid crystal, a high-molecular liquid crystal, a polymer dispersed liquid crystal (PDLC), a ferroelectric liquid crystal, an anti-ferroelectric liquid crystal, a main-chain liquid crystal, a side-chain high-molecular liquid crystal, and a banana-shaped liquid crystal.

Examples of a display method of a liquid crystal display device include a TN (Twisted Nematic) mode, an STN (Super Twisted Nematic) mode, an IPS (In-Plane-Switching) mode, an MVA (Multi-domain Vertical Alignment) mode, a PVA (Patterned Vertical Alignment) mode, an ASV (Advanced Super View) mode, an ASM (Axially Symmetric aligned Micro-cell) mode, an OCB (Optical Compensated Birefringence) mode, an ECB (Electrically Controlled Birefringence) mode, an FLC (Ferroelectric Liquid Crystal) mode, an AFLC (AntiFerroelectric Liquid Crystal) mode, a PDLC (Polymer Dispersed Liquid Crystal) mode, a PNLC (Polymer Network Liquid Crystal) mode, a guest-host mode, and a blue phase mode.

The circuit 14 illustrated in FIG. 2(B-1) includes the input terminal 14a, the capacitor 14b, a transistor 14d, a light-emitting element 14e, a wiring 34a, a wiring 34b, and a wiring 35. The input terminal 14a is electrically connected to one electrode of the capacitor 14b and a gate of the transistor 14d. One of a source and a drain of the transistor 14d is electrically connected to the wiring 34a. The other of the source and the drain of the transistor 14d is electrically connected to one electrode of the light-emitting element 14e. The other electrode of the light-emitting element 14e is electrically connected to the wiring 34b. The other electrode of the capacitor 14b is electrically connected to the wiring 35. Although not illustrated, the other electrode of the capacitor 14b may be connected to one of the source and the drain of the transistor 14d. For example, the wiring 34a may be supplied with an anode potential, and the wiring 34b may be supplied with a cathode potential. Alternatively, the wiring 34a may be supplied with a cathode potential, and the wiring 34b may be supplied with an anode potential.

The circuit 14 illustrated in FIG. 2(B-2) is different from the circuit 14 illustrated in FIG. 2(B-1) in further including a transistor 14f and a wiring 34c. The wiring 31a is preferably electrically connected to a gate of the transistor 14f.

The operation of the transistor 14f is described as an example. Although not illustrated, the other electrode of the capacitor 14b may be connected to one of the source and the drain of the transistor 14d. When display data supplied to the wiring 32a is supplied to the capacitor 14b, it is preferable that the transistor 12 be in the on state and a scan signal supplied to the wiring 31a bring the transistor 11 and the transistor 14f into the on state at the same time. The display data can be supplied to one electrode of the capacitor 14b through the input terminal 14a. When the display data is supplied to the capacitor 14b, the potential of the other of the source and the drain of the transistor 14d is preferably fixed by a potential supplied from the wiring 34c. Thus, the display data supplied to one electrode of the capacitor 14b can be accurately supplied as a potential using the potential of the other of the source and the drain of the transistor 14d as a reference.

Next, an operation example different from the above operation of the transistor 14f is described. In the case where the other electrode of the capacitor 14b is electrically connected to the other of the source and the drain of the transistor 14d, the transistor 12 is in the off state and the scan signal supplied to the wiring 31a brings the transistor 14f into the on state. The transistor 14f being brought into the on state makes it possible to measure the current flowing to the transistor 14d through the wiring 34c. The measurement of the current flowing through the transistor 14d enables variation in the electrical characteristics of the transistor 14d or deterioration of the electrical characteristics of the transistor 14d to be compensated for.

In the pixel 10 including the transistor 12, the current value of the transistor 14d in the display region displaying a still image can be measured. However, in the case where the transistor 14d has a small current value, it sometimes takes time to measure current. Thus, the values of current flowing through a plurality of wirings 34c may be collectively measured. Measuring the values of current flowing through the plurality of wirings 34c collectively, i.e., measuring the current values of a plurality of transistors 14d collectively, can reduce the number of measurement points even when each transistor 14d has a small current value. Note that it is preferable that the same display data be supplied to the pixels subjected to the measurement, or the same potential be supplied to the wirings 34b, for example.

In order to compensate for the deterioration of the electrical characteristics of the transistor 14d more accurately, the potential supplied to the wiring 34b is preferably the same as the potential supplied to the wiring 34c. The current value of the transistor 14d can be measured without being affected by the light-emitting element 14e. A compensation value may be calculated by comparison between the measured current value and a management table that manages the current value of the transistor 14d, or a difference between the measured current value and the previously measured current value may be calculated as the compensation value. By addition of the compensation value to the display data, third display data that has been compensated for can be supplied to the pixel 10.

The wiring 33a, the wiring 33b, the wiring 34a, the wiring 34b, the wiring 34c, and the wiring 35 are electrically connected to the plurality of pixels. Note that each of the wirings is preferably electrically connected to the plurality of pixels connected to the signal lines, the plurality of pixels connected to the scan lines, all the pixels, or the like as appropriate. For example, the wiring 34c is preferably connected to the plurality of pixels connected to each of the signal lines, which are regarded as one unit. The wiring 34a and the wiring 34b are preferably electrically connected to all the pixels.

FIG. 3 is a circuit diagram illustrating a structure example of a display device different from that in FIG. 1. Note that the display device includes a pixel and a plurality of wirings.

Figure 3A:
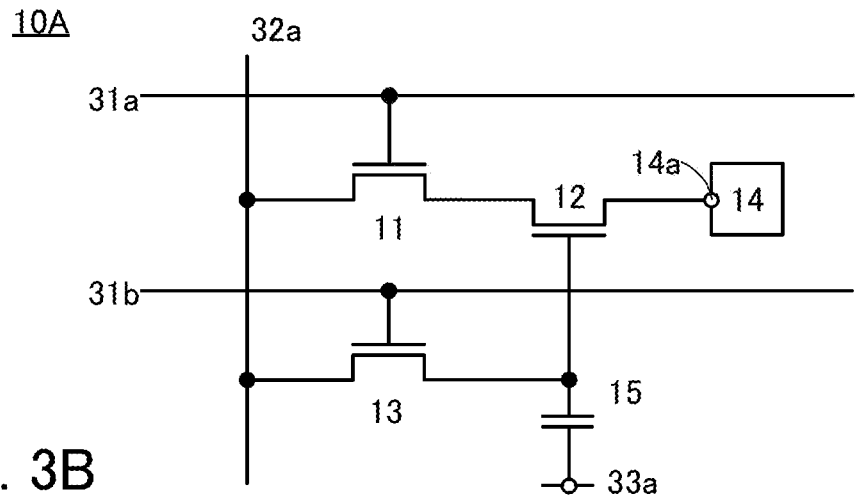
FIGS. 3A-3C are circuit diagrams illustrating structure examples of a display device.

A pixel 10A illustrated in FIG. 3(A) can be supplied with display data and setting data from the wiring 32a. That is, the wiring 32a is electrically connected to one of the source and the drain of the transistor 11 and one of the source and the drain of the transistor 13. Thus, a reduction in the number of wirings can increase the aperture ratio of the pixel 10A.

Alternatively, the display device with higher resolution can be obtained while maintaining the aperture ratio of the pixel 10A.

Figure 3B:
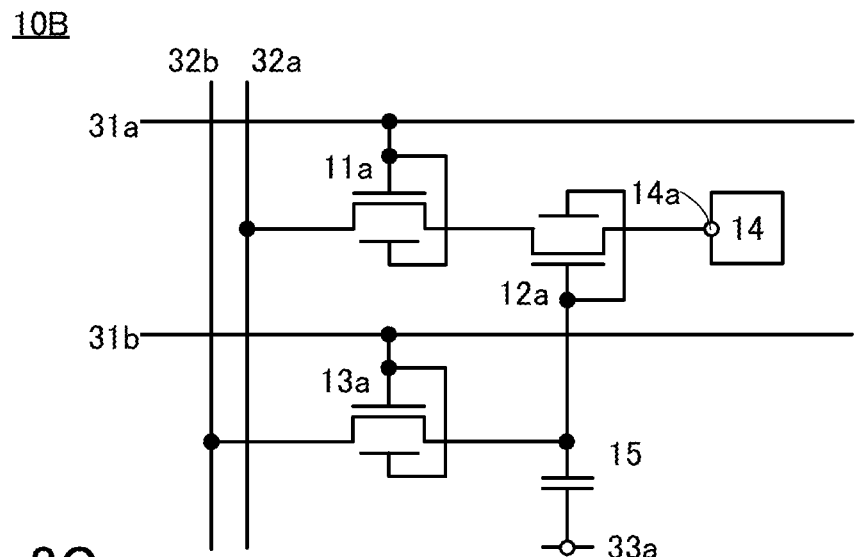

A pixel 10B illustrated in FIG. 3(B) includes a transistor 11a to a transistor 13a. The transistor 11a to the transistor 13a each preferably include a metal oxide in a semiconductor layer. In addition, the transistor 11a to the transistor 13a each have a back gate. A transistor including a metal oxide in a semiconductor layer and having a back gate can control the threshold voltage of the transistor.

For example, when a gate of each transistor is electrically connected to the back gate, an effect similar to an effect obtained when the thickness of a semiconductor film is reduced can be obtained. Thus, the on-state current can be increased as compared with the case where the number of electrodes is one. Accordingly, the use of a transistor having this structure in the pixel 10B can increase the on-state current, so that the size of the transistor can be reduced. Therefore, with the use of the pixel 10B, the display device with higher resolution can be obtained.

Figure 3C:
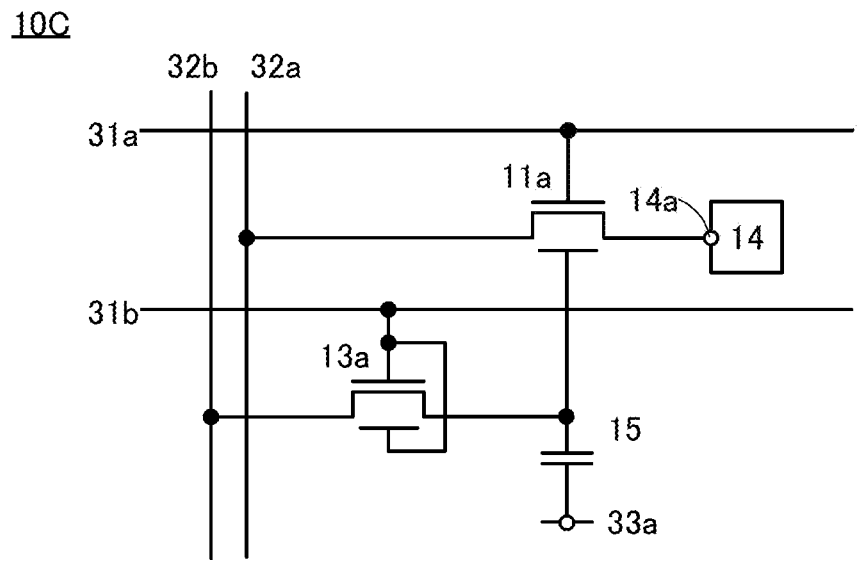

A pixel 10C illustrated in FIG. 3(C) is different from the pixel 10B illustrated in FIG. 3(B) in not including the transistor 12a. Instead of the transistor 12a, one electrode of the capacitor 15 is electrically connected to the back gate of the transistor 11a. Thus, the setting data supplied to the capacitor 15 is supplied to the back gate of the transistor 11a. The setting data supplied to the back gate of the transistor 11a controls the threshold voltage of the transistor. Thus, the on/off state of the transistor 11a can be controlled by the setting data supplied to the capacitor 15. Accordingly, a reduction in the number of transistors can increase the aperture ratio of the pixel 10C. Alternatively, the display device with higher resolution can be obtained while maintaining the aperture ratio of the pixel 10C.

Although FIGS. 3(B) and 3(C) illustrate an example in which the transistor has the back gate, the transistor including a metal oxide in the semiconductor layer does not necessarily have the back gate. In addition, although an example in which the gate of the transistor is connected to the back gate is illustrated, the back gate may be connected to the source of the transistor or an external wiring.

FIG. 4 is a circuit diagram illustrating a structure example of a display device different from that in FIG. 1. Note that the display device includes a pixel and a plurality of wirings.

Figure 4A:
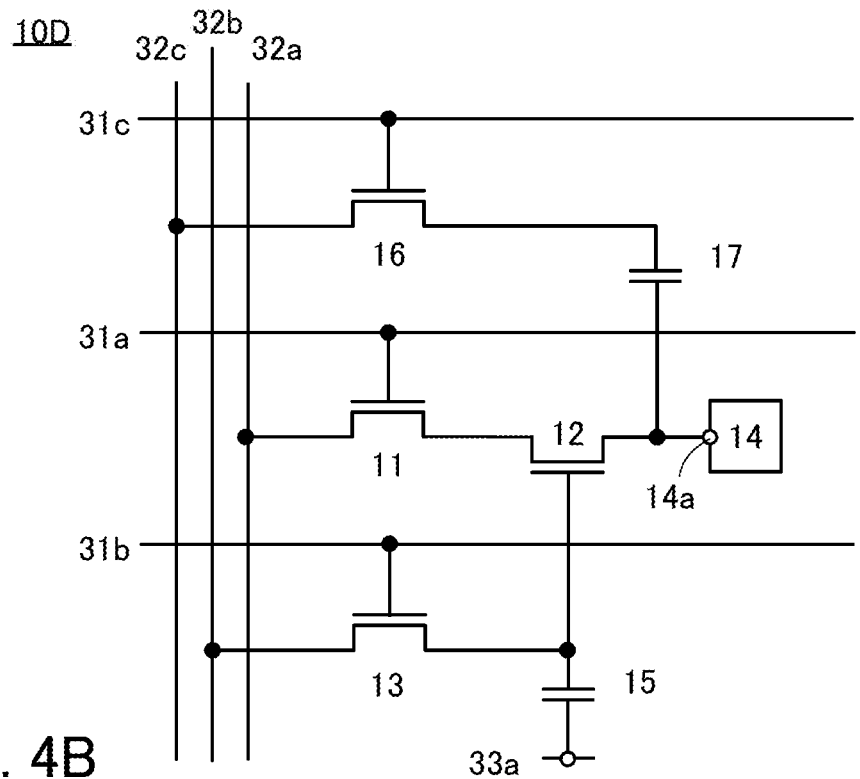
FIGS. 4A and 4B are circuit diagrams illustrating structure examples of a display device.

The display device illustrated in FIG. 4(A) is different from the display device illustrated in FIG. 1 in that a wiring 31c serving as a scan line and a wiring 32c serving as a signal line are included and a pixel 10D includes a transistor 16 and a capacitor 17. A gate of the transistor 16 is electrically connected to the wiring 31c. One of a source and a drain of the transistor 16 is electrically connected to the wiring 32c. The other of the source and the drain of the transistor 16 is electrically connected to one electrode of the capacitor 17. The other electrode of the capacitor 17 is electrically connected to the input terminal 14a of the circuit 14.

For example, in the case where the transistor 12 is in the on state in the pixel 10D, display data supplied to the wiring 32a can be written to the circuit 14 through the transistor 11. Next, in the case where the transistor 12 is brought into the off state and/or the transistor 11 is brought into the off state, first data supplied to the wiring 32c can be supplied to one electrode of the capacitor 17 through the transistor 16. The capacitor 17 can add the first data to the display data supplied to the circuit 14 in accordance with charge conservation of a capacitor.

Thus, the pixel 10D can add the first data to the display data and generate fourth display data to be supplied to the circuit 14. Since the pixel 10D can add the first data to the display data, the voltage range of the display data output from a source driver, which is included in the display device and supplies the display data to the pixel, can be reduced. Reducing the output voltage range of the source driver can reduce power consumption. The structure of the pixel 10D is particularly suitable for the case where the circuit 14 includes the liquid crystal element 14c. The liquid crystal element 14c sometimes requires application of a high voltage to the display data.

Figure 4B:
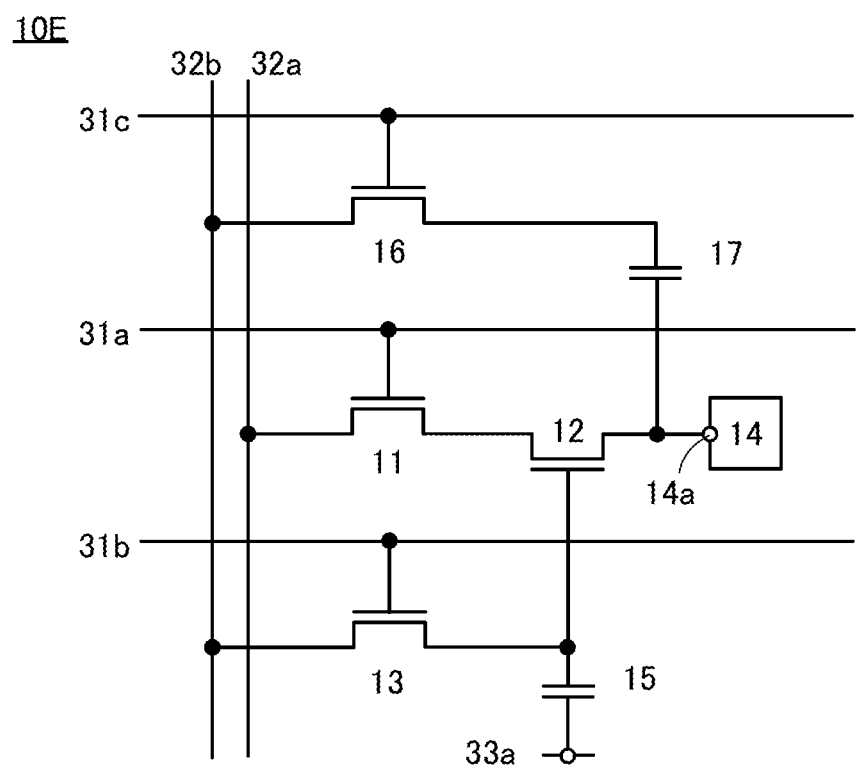

A pixel 10E illustrated in FIG. 4(B) is different from the pixel 10D illustrated in FIG. 4(A) in that the setting data and the first data can be supplied from the wiring 32b to the pixel 10E. That is, the wiring 32b is electrically connected to one of the source and the drain of the transistor 13 and one of the source and the drain of the transistor 16. The setting data controls the state where the display data of the circuit 14 is updated or the state where the display data of the circuit 14 is not updated; hence, the frequency of supplying the setting data from the wiring 32b to the capacitor 15 can be reduced. Thus, a reduction in the number of wirings can increase the aperture ratio of the pixel 10E. Alternatively, the display device with higher resolution can be obtained while maintaining the aperture ratio of the pixel 10E.

Figure 5A:
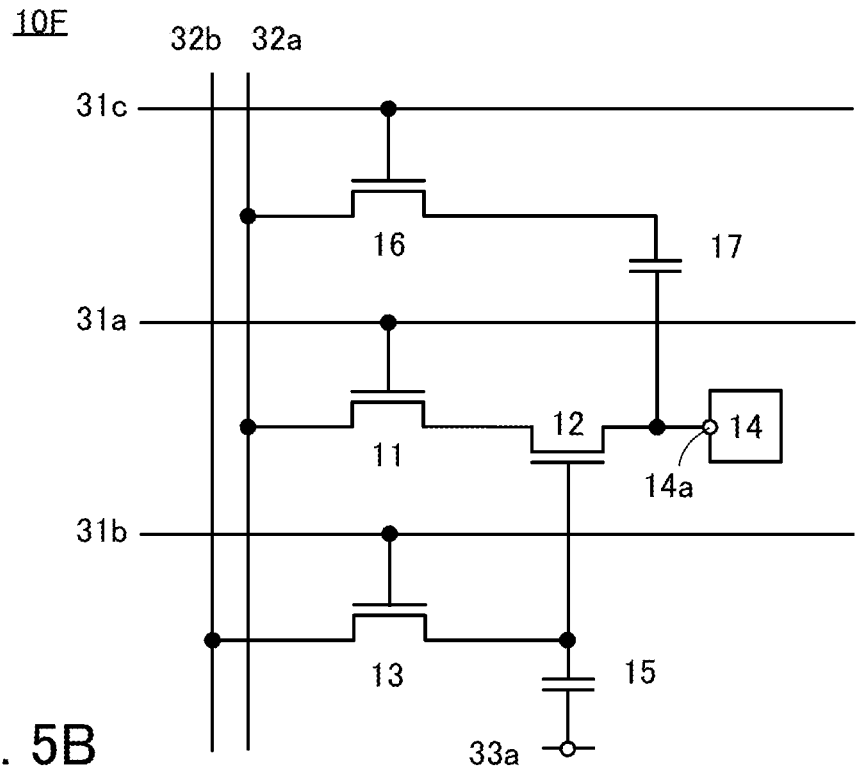
FIGS. 5A and 5B are circuit diagrams illustrating structure examples of a display device.

A pixel 10F illustrated in FIG. 5(A) is different from the pixel 10D illustrated in FIG. 4(A) in that the display data and the first data can be supplied from the wiring 32a to the pixel 10F. That is, the wiring 32a is electrically connected to one of the source and the drain of the transistor 11 and one of the source and the drain of the transistor 16. Note that the wiring 32b is electrically connected to one of the source and the drain of the transistor 13. The setting data controls the state where the display data of the circuit 14 is updated or the state where the display data of the circuit 14 is not updated; hence, the frequency of supplying the setting data from the wiring 32b to the capacitor 15 can be reduced. Thus, a reduction in the number of wirings can increase the aperture ratio of the pixel 10F as compared with that of the pixel 10D. Alternatively, the display device with higher resolution can be obtained while maintaining the aperture ratio of the pixel 10F. Note that the description of the detailed operation of the pixel 10F is omitted because the description of FIG. 1 or FIG. 4(A) can be referred to.

Figure 5B:
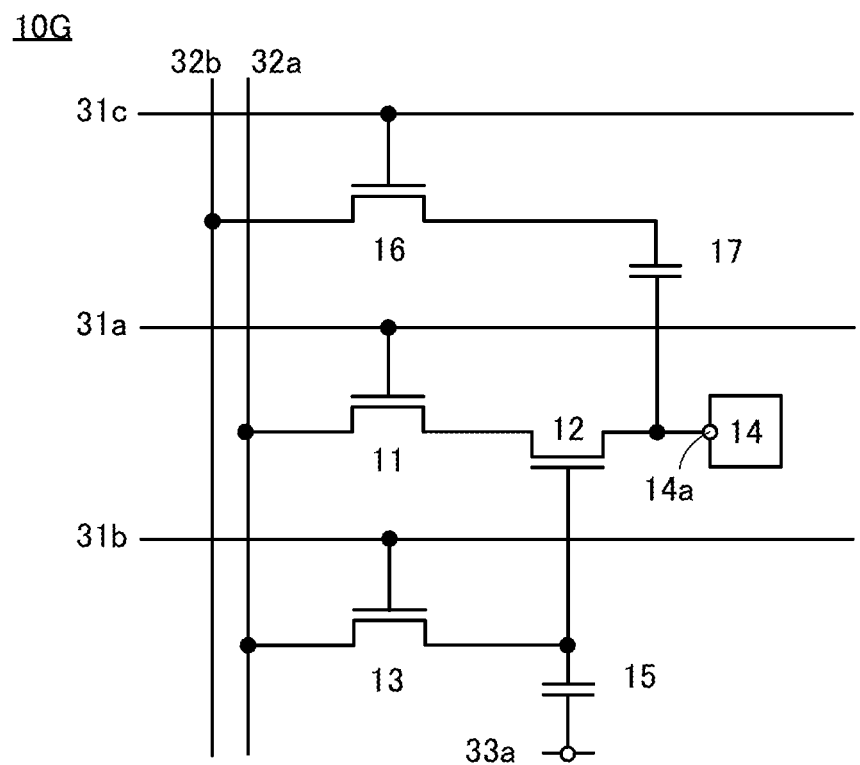

A pixel 10G illustrated in FIG. 5(B) is different from the pixel 10D illustrated in FIG. 4(A) in that the display data and the setting data can be supplied from the wiring 32a to the pixel 10G. That is, the wiring 32a is electrically connected to one of the source and the drain of the transistor 11 and one of the source and the drain of the transistor 13. Note that the wiring 32b is electrically connected to one of the source and the drain of the transistor 16. The setting data controls the state where the display data of the circuit 14 is updated or the state where the display data of the circuit 14 is not updated; hence, the frequency of supplying the setting data from the wiring 32b to the capacitor 15 can be reduced. Thus, a reduction in the number of wirings can increase the aperture ratio of the pixel 10G as compared with that of the pixel 10D. Alternatively, the display device with higher resolution can be obtained while maintaining the aperture ratio of the pixel 10G. Note that the description of the detailed operation of the pixel 10G is omitted because the description of FIG. 3(A) or FIG. 4(A) can be referred to.

Figure 6A:
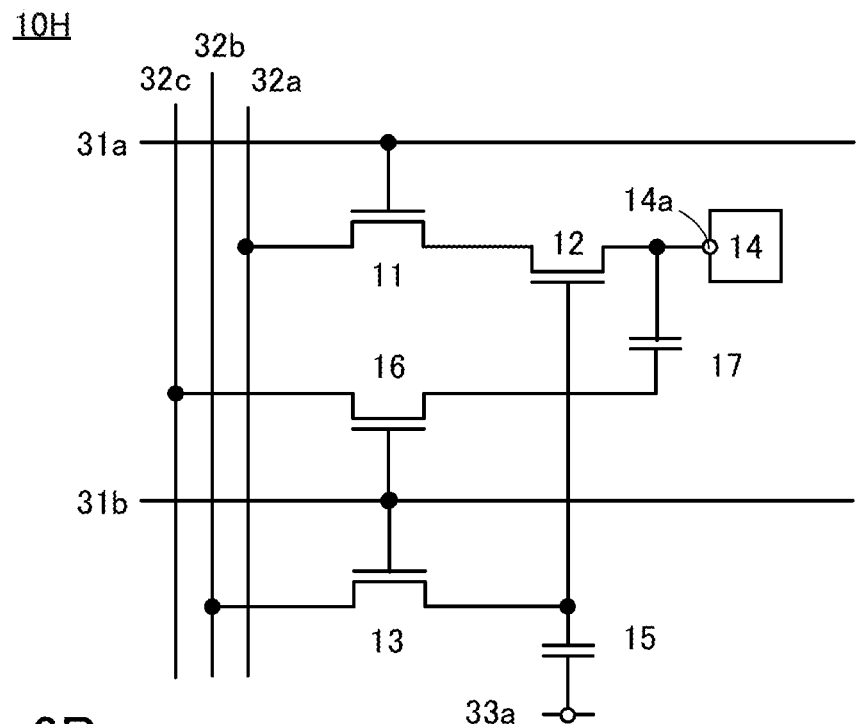
FIGS. 6A and 6B are circuit diagrams illustrating structure examples of a display device.

A pixel 10H illustrated in FIG. 6(A) is different from the pixel 10D illustrated in FIG. 4(A) in not including the wiring 31c. The wiring 31a is electrically connected to the gate of the transistor 11. The wiring 31b is electrically connected to the gate of the transistor 13 and the gate of the transistor 16.

The operation of the pixel 10H is described. First, the setting data is supplied to the capacitor 15 through the transistor 13. Next, the display data is supplied to the circuit 14 through the transistor 11. Next, the transistor 12 is brought into the non-conduction state through the transistor 13 and the first data is supplied to the capacitor 17 through the transistor 16, whereby the first data is added to the display data. Different data signals are supplied to the wiring 32a, the wiring 32b, and the wiring 32c. Thus, a reduction in the number of wirings can increase the aperture ratio of the pixel 10H as compared with that of the pixel 10D. Alternatively, the display device with higher resolution can be obtained while maintaining the aperture ratio of the pixel 10H.

Figure 6B:
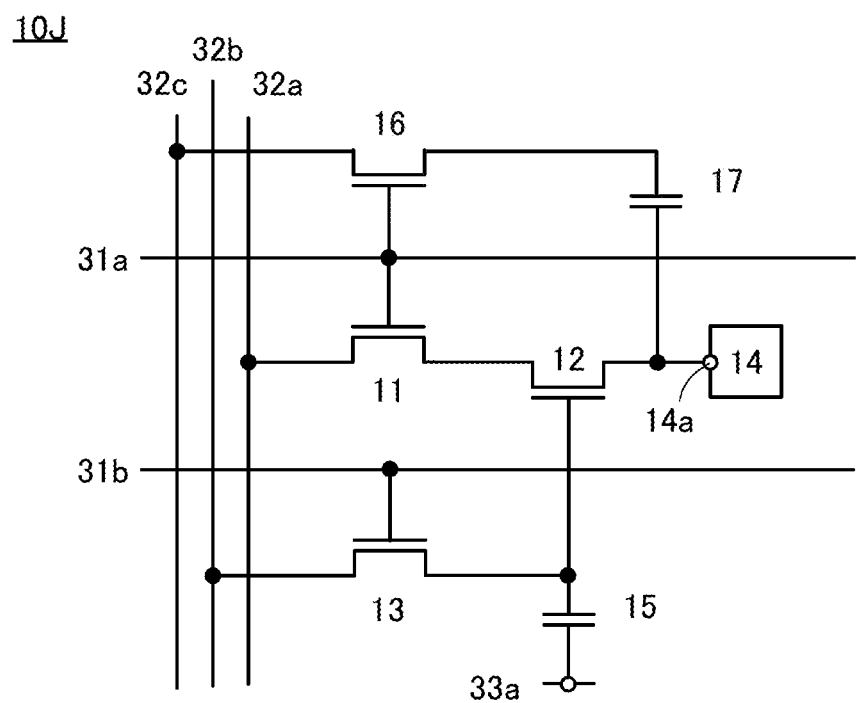

A pixel 10J illustrated in FIG. 6(B) is different from the pixel 10H illustrated in FIG. 6(A) in that the wiring 31a is electrically connected to the gate of the transistor 11 and the gate of the transistor 16 and the wiring 31b is electrically connected to the gate of the transistor 13.

The operation of the pixel 10J is described. First, the setting data is supplied to the capacitor 15 through the transistor 13. Next, the display data is supplied to the circuit 14 through the transistor 11. Next, the transistor 12 is brought into the non-conduction state through the transistor 13 and the first data is supplied to the capacitor 17 through the transistor 16, whereby the first data is added to the display data. Different data signals are supplied to the wiring 32a, the wiring 32b, and the wiring 32c. Thus, a reduction in the number of wirings can increase the aperture ratio of the pixel 10J as compared with that of the pixel 10D. Alternatively, the display device with higher resolution can be obtained while maintaining the aperture ratio of the pixel 10H.

<<Display Device>>

Figure 7:
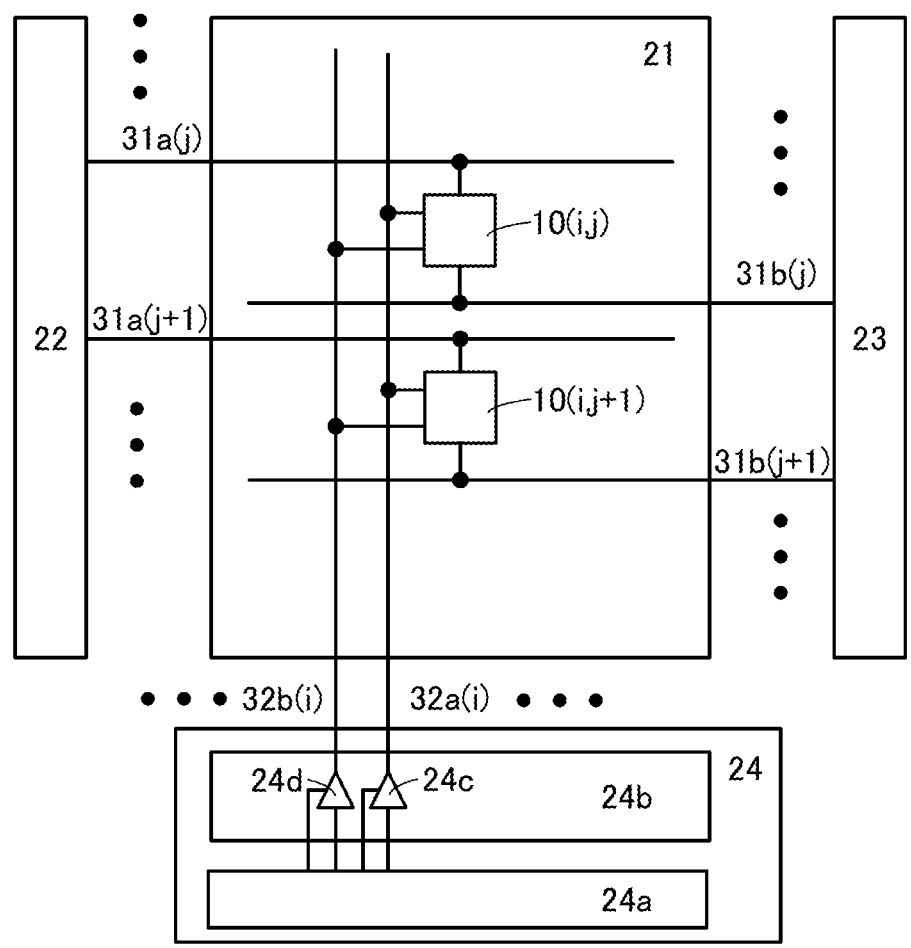
FIG. 7 is a block diagram illustrating a structure example of a display device.

FIG. 7 illustrates the details of the display device. A display device 20 includes a display portion 21, a gate driver 22, a gate driver 23, and a source driver 24. The display portion 21 includes a plurality of pixels 10. The gate driver 22 can supply a scan signal to the wiring 31a, and the gate driver 23 can supply a scan signal to the wiring 31b. The source driver 24 includes a digital-analog converter circuit 24a and a buffer circuit 24b. The buffer circuit 24b includes a plurality of buffer circuits 24c and a plurality of buffer circuits 24d.

The buffer circuit 24c that supplies display data to the wiring 32a is preferably capable of bringing the output in a period during which the display data is not output into a floating state. The buffer circuit 24d that supplies setting data to the wiring 32b preferably outputs an "L" voltage in a period during which the setting data is not output. The source driver 24 can supply the display data to the wiring 32a, and can supply the setting data to the wiring 32b. Note that the digital-analog converter circuit 24a is preferably connected to a display controller (not illustrated in FIG. 7).

The display device 20 illustrated in FIG. 7 can supply the scan signals to the wiring 31a and the wiring 31b at different timings. That is, when the display controller determines that the display data is a still image, the display controller can supply the setting data for setting the state where the display data is not updated to the pixel 10 with the use of the gate driver 23 at a given timing. Thus, the scan signal supplied to the wiring 31b is preferably capable of selecting the pixel 10 at a different timing from the gate driver 22 updating the display data of the pixel 10. The gate driver 23 may be composed of a shift register circuit like the gate driver 22, or is further preferably composed of a decoder circuit. The gate driver 23 composed of the decoder circuit can directly select the scan line in which the setting data is desired to be changed.

Note that in the first period, the display data of all the pixels included in the display region is updated. Next, when the display controller determines that the display data is a still image, the setting data for setting the state where the display data is not updated can be supplied to the first pixel in the display region with the use of the gate driver 23 in the second period. Alternatively, when the display controller determines that the display data is a moving image, the setting data for setting the state where the display data is updated can be supplied to the second pixel in the display region in the second period. Next, in the third period, display using the display data supplied to the first pixel and the second pixel can be performed at the same time. As described above, display using the display data supplied at different timings can be performed on the display region at the same time.

That is, the display data of the display region displaying a moving image is updated at a frequency optimal for the visibility of the display, and the display data of the display region displaying a still image is updated at a low frequency aiming for low power consumption. The above-described driving method can be called partial IDS driving because the IDS driving is partially performed. This driving method is suitable for an electronic device that operates with a battery requiring low power consumption.

Moreover, when the display controller determines that the display data of the pixel 10 does not need to be updated, the output from the buffer circuit 24c is preferably brought into a floating state. When the output from the buffer circuit 24c is brought into a floating state, power for charging and discharging the wiring 32a can be reduced.

Figure 8:
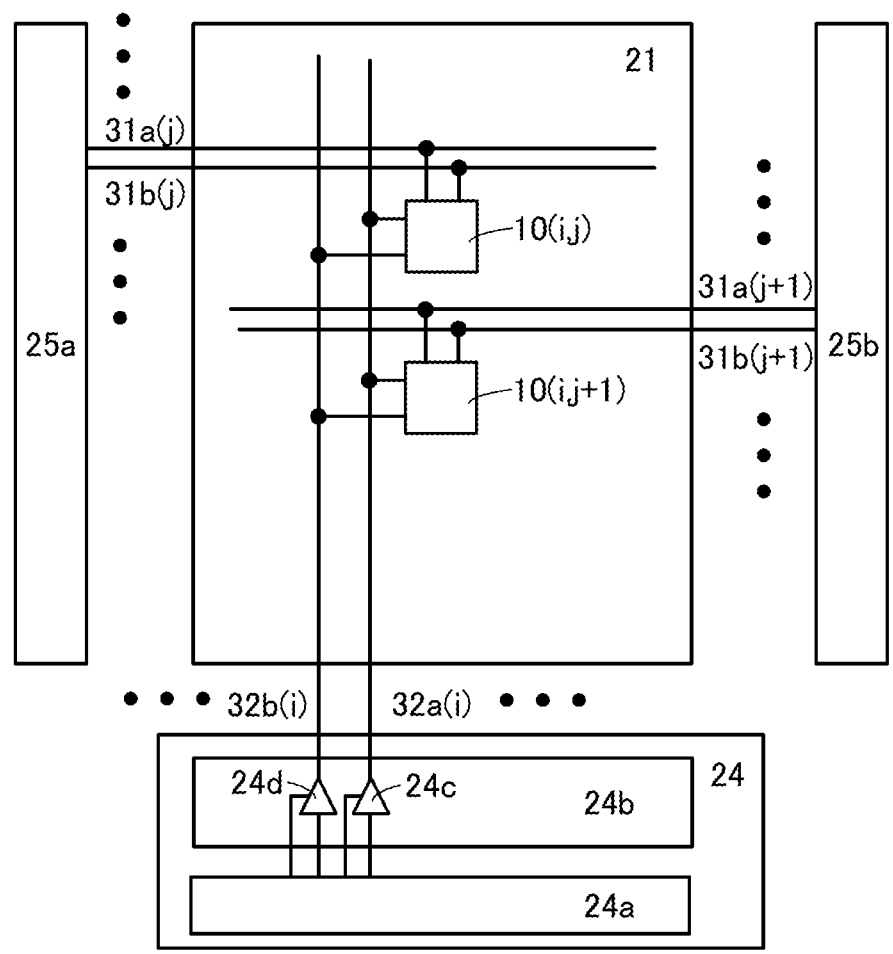
FIG. 8 is a block diagram illustrating a structure example of a display device.

In a display device 20A illustrated in FIG. 8, a gate driver 25a can supply scan signals to the wirings 31a or the wirings 31b in the odd-numbered rows, and a gate driver 25b can supply scan signals to the wirings 31a or the wirings 31b in the even-numbered rows. Note that unlike in FIG. 7, it is preferable that the scan signals supplied to the wirings 31a or the wirings 31b be sequentially supplied to the pixel 10.

The case where the display controller determines that the display data is a still image is described. In a period during which the scan signal is supplied to the wiring 31b, the setting data for setting the state where the display data is not updated is supplied to the pixel 10 through the wiring 32b. Then, in a period during which the scan signal is supplied to the wiring 31a, the output from the buffer circuit 24b is preferably brought into a floating state. Note that the display data is not necessarily supplied to the pixel 10 through the wiring 32a. Even when the display data is supplied to the pixel 10, the display data is not written to the pixel. Note that the gate driver 25a and the gate driver 25b are each preferably a shift register circuit.

Figure 9A:
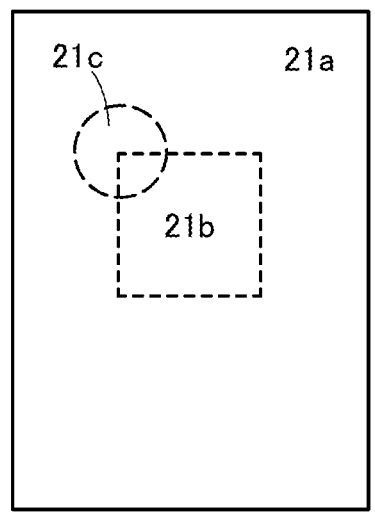
FIG. 9A is a display example of a display device.

FIG. 9(A) illustrates an example in which the display device 20 performs display on the display portion 21. The display portion 21 includes a display region 21a and a display region 21b. FIG. 9(A) illustrates an example in which a still image is displayed on the display region 21a, and a moving image is displayed on the display region 21b. The display data of the display region 21b on which a moving image is displayed is preferably updated every frame. However, the display data of the display region 21a on which a still image is displayed is preferably updated once every plural times the display data of the display region 21b is updated. The display data of the display region 21a is further preferably updated once every 30 times or more the display data of the display region 21b is updated. The display data of the display region 21a is still further preferably updated once every 60 times or more the display data of the display region 21b is updated. As the number of times of updating the display data of the display region 21a is smaller than the number of times of updating the display data of the display region 21b, the power consumption can be reduced more.

Figure 9B:
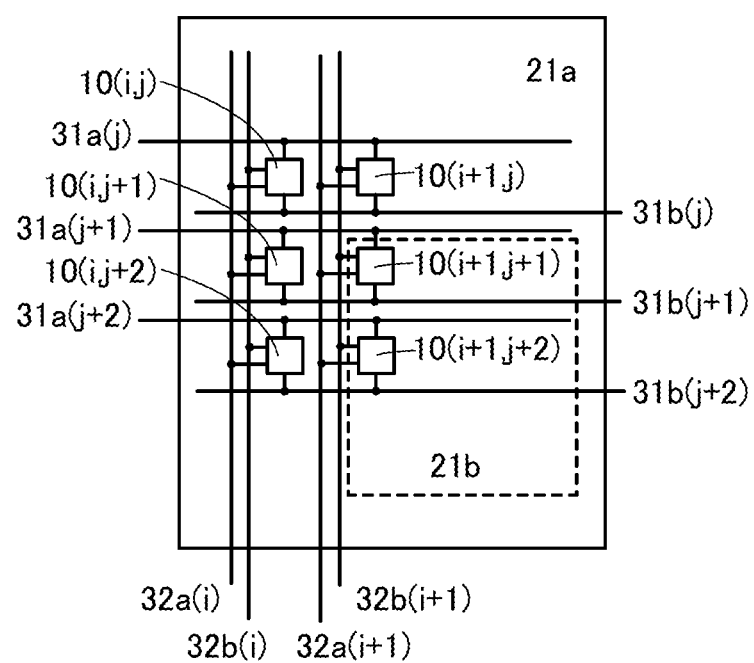
FIG. 9B is a block diagram illustrating a structure example of a display device.

FIG. 9(B) is an enlarged view of a region 21c that is a boundary portion between the display region 21a and the display region 21b in FIG. 9(A). An example in which the region 21c has the same structure as that in the display device 20 in FIG. 7 is illustrated. For example, the region 21c includes a pixel 10(i, j) to a pixel 10(i+1, j+2), a wiring 31a(j) to a wiring 31a(j+2), a wiring 31b(j) to a wiring 31b(j+2), a wiring 32a(i), a wiring 32a(i+1), a wiring 32b(i), and a wiring 32b(i+1). Note that the pixel 10(i+1, j+1) and the pixel 10(i+1, j+2) belong to the display region 21b and display a moving image; thus, their display data is preferably updated every frame.

Figure 10A:
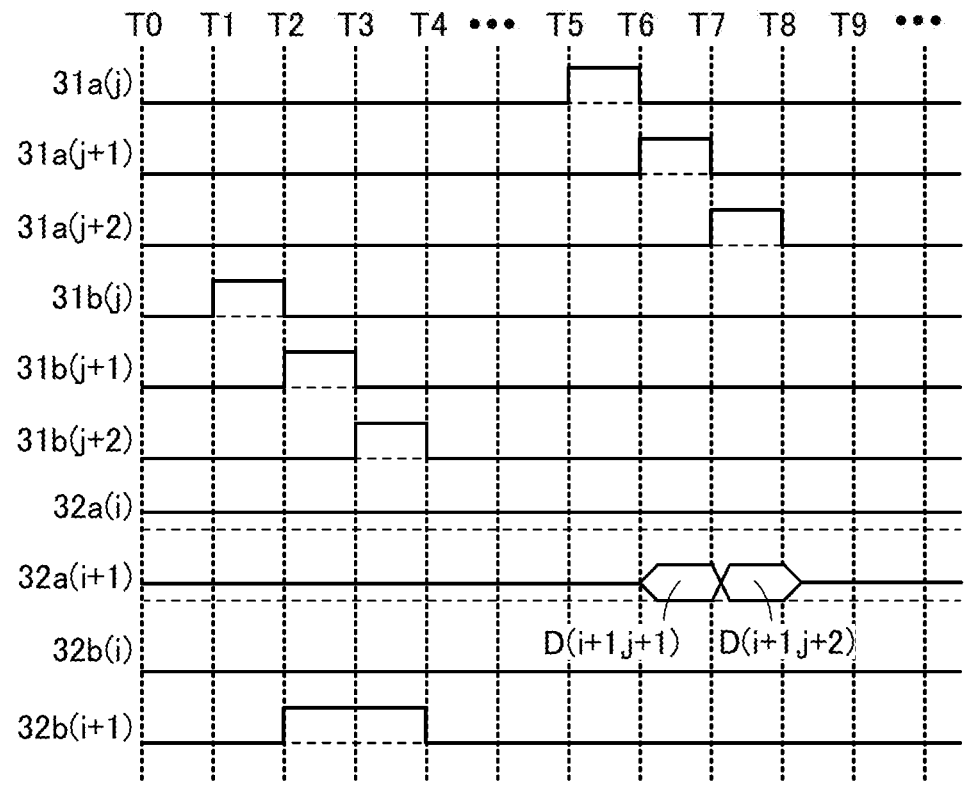
FIGS. 10A and 10B are timing charts showing an operation example of a display device.
Figure 10B:
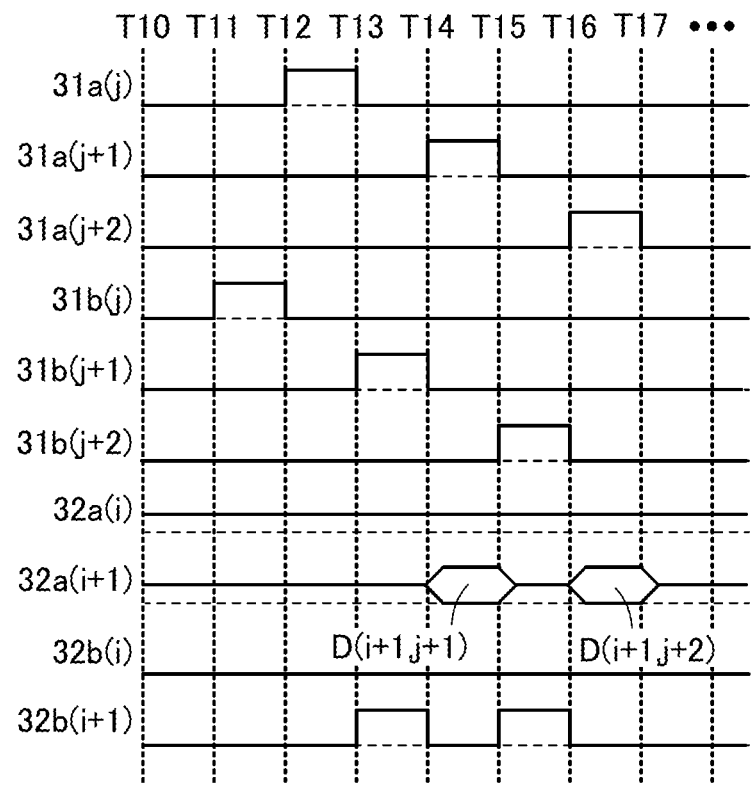

FIG. 10 shows the operation of the region 21c illustrated in FIG. 9(B) with reference to timing charts. FIGS. 10(A) and 10(B) show an example in which the display data and the setting data are supplied to the pixel 10 at different timings.

First, the operation of the region 21c is described with reference to the timing chart in FIG. 10(A). Note that the display data supplied to the wiring 32a is an analog signal including a gray level, and "L" setting data supplied to the wiring 32b is a voltage for bringing the transistor 12 into the off state. In addition, "H" setting data supplied to the wiring 32b is a voltage for bringing the transistor 12 into the on state.

At Time T1, a scan signal is supplied to the wiring 31b(j). At this time, the "L" setting data is supplied to the wiring 32b(i) and the wiring 32b(i+1). The pixel 10(i, j) and the pixel 10(i+1, j) are each in the state where the display data is not updated.

At Time T2, a scan signal is supplied to the wiring 31b(j+1). At this time, the "L" setting data is supplied to the wiring 32b(i). In addition, the "H" setting data is supplied to the wiring 32b(i+1). The pixel 10(i+1, j+1) is in the state where the display data can be updated. The pixel 10(i, j+1) is in the state where the display data is not updated.

At Time T3, a scan signal is supplied to the wiring 31b(j+2). At this time, the "L" setting data is supplied to the wiring 32b(i). In addition, the "H" setting data is supplied to the wiring 32b(i+1). The pixel 10(i+1, j+2) is in the state where the display data can be updated. The pixel 10(i, j+2) is in the state where the display data is not updated.

At Time T5, a scan signal is supplied to the wiring 31a(j). At this time, the wiring 32a(i) and the wiring 32a(i+1) are each kept in a floating state.

At Time T6, a scan signal is supplied to the wiring 31a(j+1). At this time, a signal of display data D(i+1, j+1) is supplied to the wiring 32a(i+1). The wiring 32a(i) is brought into a floating state.

At Time T7, a scan signal is supplied to the wiring 31a(j+2). At this time, a signal of display data D(i+1, j+2) is supplied to the wiring 32b(i+1). The wiring 32a(i) is brought into a floating state.

FIG. 10(A) illustrates an example in which the setting data and the display data are updated at different timings. That is, the display data is updated only when the "H" setting data is supplied to each of the pixels. FIG. 10(A) does not illustrate an example in which the display data is supplied when the "L" setting data is supplied to the pixel; the display data of the pixel is not updated by the display data supplied from the wiring 32a when the "L" setting data is supplied to the pixel.

Next, the operation of the region 21c is described with reference to the timing chart in FIG. 10(B), which is different from that in FIG. 10(A).

At Time T11, a scan signal is supplied to the wiring 31b(j). At this time, the "L" setting data is supplied to the wiring 32b(i) and the wiring 32b(i+1). The pixel 10(i, j) and the pixel 10(i+1, j) are each in the state where the display data is not updated.

At Time T12, a scan signal is supplied to the wiring 31a(j). At this time, the wiring 32a(i) and the wiring 32a(i+1) are each kept in a floating state.

At Time T13, a scan signal is supplied to the wiring 31b(j+1). At this time, the "H" setting data is supplied to the wiring 32b(i+1). The "L" setting data is supplied to the wiring 32b(i). The pixel 10(i+1, j+1) is in the state where the update of the display data is allowed.

At Time T14, a scan signal is supplied to the wiring 31a(j+1). At this time, the signal of the display data D(i+1, j+1) is supplied to the wiring 32a(i+1). The wiring 32a(i) is kept in a floating state.

At Time T15, a scan signal is supplied to the wiring 31b(j+2). At this time, the "H" setting data is supplied to the wiring 32b(i+1). The "L" setting data is supplied to the wiring 32b(i). The pixel 10(i+1, j+1) is in the state where the update of the display data is allowed.

At Time T16, a scan signal is supplied to the wiring 31a(j+2). At this time, the signal of the display data D(i+1, j+2) is supplied to the wiring 32a(i+1). The wiring 32a(i) is kept in a floating state.

FIG. 10(B) illustrates an example in which the setting data and the display data are sequentially updated. That is, the display data is updated only when the "H" setting data is supplied to each of the pixels. FIG. 10(B) does not illustrate an example in which the display data is supplied when the "L" setting data is supplied to the pixel; the display data of the pixel is not updated when the "L" setting data is supplied to the pixel.

For example, the case where the above-described display device is used for a smartphone, a tablet, a laptop computer, or the like is described. In the case where a moving image is watched on a smartphone, for example, the "H" setting data is supplied to a pixel in a display region on which the moving image is displayed, and the "L" setting data is supplied to a pixel in a display region on which a still image is displayed. The display data of the pixel in the display region on which the still image is displayed is not updated, which can thus reduce the power consumption.

For another example, the case where the above-described display device is used for a video camera, a game machine, or the like is described. In the case where a moving image is watched on a video camera or the like, for example, the above-described function is used for specifying a display region desired to be obtained as a still image in the moving image with the use of an input device such as a touch panel. The display region at the time selected by the input device such as the touch panel can be easily obtained as a still image.

This embodiment can be implemented in appropriate combination with any of the other embodiments.

Embodiment 2

In this embodiment, examples of transistors that can be used as the transistors described in Embodiment 1 will be described with reference to the drawings.

The pixel 10 included in the display device 20 can be fabricated using a transistor with any of various structures, such as a bottom-gate transistor or a top-gate transistor. Therefore, a material for a semiconductor layer or the transistor structure can be easily changed depending on the existing production line.

<<Bottom-Gate Transistor>>

FIG. 11(A1) is a cross-sectional view of a channel-protective transistor 810, which is a type of bottom-gate transistor, in the channel length direction. In FIG. 11(A1), the transistor 810 is formed over a substrate 860. The transistor 810 includes an electrode 858 over the substrate 860 with an insulating layer 861 therebetween. The transistor 810 also includes a semiconductor layer 856 over the electrode 858 with an insulating layer 852 therebetween. The electrode 858 can function as a gate electrode. The insulating layer 852 can function as a gate insulating layer.

The transistor 810 includes an insulating layer 855 over a channel formation region in the semiconductor layer 856. The transistor 810 also includes an electrode 857a and an electrode 857b that are over the insulating layer 852 and partly in contact with the semiconductor layer 856. The electrode 857a can function as one of a source electrode and a drain electrode. The electrode 857b can function as the other of the source electrode and the drain electrode. Part of the electrode 857a and part of the electrode 857b are formed over the insulating layer 855.

The insulating layer 855 can function as a channel protective layer. With the insulating layer 855 provided over the channel formation region, the semiconductor layer 856 can be prevented from being exposed at the time of forming the electrode 857a and the electrode 857b. Thus, the channel formation region in the semiconductor layer 856 can be prevented from being etched at the time of forming the electrode 857a and the electrode 857b. According to one embodiment of the present invention, a transistor with favorable electrical characteristics can be provided.

The transistor 810 includes an insulating layer 853 over the electrode 857a, the electrode 857b, and the insulating layer 855 and also includes an insulating layer 854 over the insulating layer 853.

With the insulating layer 854, the semiconductor layer 856 can be prevented from being exposed at the time of forming the electrode 857a and the electrode 857b. Thus, the semiconductor layer 856 can be prevented from being reduced in thickness at the time of forming the electrode 857a and the electrode 857b.

In the case where an oxide semiconductor is used for the semiconductor layer 856, a material capable of removing oxygen from part of the semiconductor layer 856 to generate oxygen vacancies is preferably used at least for portions of the electrode 857a and the electrode 857b that are in contact with the semiconductor layer 856. The carrier concentration in the regions of the semiconductor layer 856 where oxygen vacancies are generated is increased, so that the regions become n-type regions ($n^+$ layers). Accordingly, the regions can function as a source region and a drain region. When an oxide semiconductor is used for the semiconductor layer 856, examples of the material capable of removing oxygen from the semiconductor layer 856 to generate oxygen vacancies include tungsten and titanium.

Formation of the source region and the drain region in the semiconductor layer 856 makes it possible to reduce contact resistance between the semiconductor layer 856 and each of the electrode 857a and the electrode 857b. Accordingly, the electrical characteristics of the transistor, such as the field-effect mobility and the threshold voltage, can be improved.

In the case where a semiconductor such as silicon is used for the semiconductor layer 856, a layer that functions as an n-type semiconductor or a p-type semiconductor is preferably provided between the semiconductor layer 856 and the electrode 857a and between the semiconductor layer 856 and the electrode 857b. The layer that functions as an n-type semiconductor or a p-type semiconductor can function as the source region or the drain region in the transistor.

The insulating layer 854 is preferably formed using a material that has a function of preventing or reducing diffusion of impurities into the transistor from the outside. Note that the insulating layer 854 can be omitted as necessary.

A transistor 811 illustrated in FIG. 11(A2) is different from the transistor 810 in that an electrode 850 that can function as a back gate electrode is provided over the insulating layer 854. The electrode 850 can be formed using a material and a method similar to those for the electrode 858.

In general, a back gate electrode is formed using a conductive layer and positioned such that a channel formation region in a semiconductor layer is sandwiched between a gate electrode and the back gate electrode. Thus, the back gate electrode can function in a manner similar to that of the gate electrode. The potential of the back gate electrode may be the same as the potential of the gate electrode or may be a ground potential (GND potential) or a given potential. When the potential of the back gate electrode is changed independently of the potential of the gate electrode, the threshold voltage of the transistor can be changed.

The electrode 858 and the electrode 850 can each function as a gate electrode. Thus, the insulating layer 852, the insulating layer 853, and the insulating layer 854 can each function as a gate insulating layer. The electrode 850 may be provided between the insulating layer 853 and the insulating layer 854.

In the case where one of the electrode 858 and the electrode 850 is referred to as a "gate electrode", the other is referred to as a "back gate electrode". For example, in the transistor 811, in the case where the electrode 850 is referred to as a "gate electrode", the electrode 858 is referred to as a "back gate electrode". In the case where the electrode 850 is used as a "gate electrode", the transistor 811 can be regarded as a kind of top-gate transistor. One of the electrode 858 and the electrode 850 may be referred to as a "first gate electrode", and the other may be referred to as a "second gate electrode".

By providing the electrode 858 and the electrode 850 with the semiconductor layer 856 therebetween and setting the potentials of the electrode 858 and the electrode 850 to the same potential, a region of the semiconductor layer 856 through which carriers flow is enlarged in the film thickness direction; thus, the number of transferred carriers is increased. As a result, the on-state current of the transistor 811 is increased and the field-effect mobility is increased.

Therefore, the transistor 811 is a transistor having a high on-state current for its occupation area. That is, the occupation area of the transistor 811 can be small for required on-state current. According to one embodiment of the present invention, the occupation area of a transistor can be reduced. Therefore, according to one embodiment of the present invention, a semiconductor device having a high degree of integration can be provided.

The gate electrode and the back gate electrode are formed using conductive layers and thus each have a function of preventing an electric field generated outside the transistor from affecting the semiconductor layer in which the channel is formed (in particular, an electric field blocking function against static electricity and the like). When the back gate electrode is formed larger than the semiconductor layer such that the semiconductor layer is covered with the back gate electrode, the electric field blocking function can be enhanced.

When the back gate electrode is formed using a light-blocking conductive film, light can be prevented from entering the semiconductor layer from the back gate electrode side. Therefore, photodegradation of the semiconductor layer can be prevented, and deterioration in electrical characteristics of the transistor, such as a shift of the threshold voltage, can be prevented.

According to one embodiment of the present invention, a transistor with high reliability can be provided. Moreover, a semiconductor device with high reliability can be provided.

FIG. 11(B1) is a cross-sectional view of a channel-protective transistor 820, which has a structure different from that of FIG. 11(A1), in the channel length direction. The transistor 820 has substantially the same structure as the transistor 810 but is different from the transistor 810 in that the insulating layer 855 covers end portions of the semiconductor layer 856. The semiconductor layer 856 is electrically connected to the electrode 857*a* through an opening portion formed by selectively removing part of the insulating layer 855 that overlaps with the semiconductor layer 856. The semiconductor layer 856 is electrically connected to the electrode 857*b* through another opening portion formed by selectively removing part of the insulating layer 855 that overlaps with the semiconductor layer 856. A region of the insulating layer 855 that overlaps with the channel formation region can function as a channel protective layer.

A transistor 821 illustrated in FIG. 11(B2) is different from the transistor 820 in that the electrode 850 that can function as a back gate electrode is provided over the insulating layer 854.

The distance between the electrode 857*a* and the electrode 858 and the distance between the electrode 857*b* and the electrode 858 are longer in the transistor 820 and the transistor 821 than in the transistor 810 and the transistor 811. Thus, the parasitic capacitance generated between the electrode 857*a* and the electrode 858 can be reduced. Moreover, the parasitic capacitance generated between the electrode 857*b* and the electrode 858 can be reduced. According to one embodiment of the present invention, a transistor with favorable electrical characteristics can be provided.

FIG. 11(C1) is a cross-sectional view of a channel-etched transistor 825, which is a type of bottom-gate transistor, in the channel length direction. In the transistor 825, the electrode 857*a* and the electrode 857*b* are formed without the insulating layer 855. Thus, part of the semiconductor layer 856 that is exposed at the time of forming the electrode 857*a* and the electrode 857*b* might be etched. However, since the insulating layer 855 is not provided, the productivity of the transistor can be increased.

The transistor 825 illustrated in FIG. 11(C2) is different from the transistor 820 in that the electrode 850 that can function as a back gate electrode is provided over the insulating layer 854.

FIGS. 12(A1) to 12(C2) are cross-sectional views of the transistors 810, 811, 820, 821, 825, and 826, respectively, in the channel width direction.

In each of the structures illustrated in FIGS. 12(B2) and 12(C2), the gate electrode is connected to the back gate electrode, and the gate electrode and the back gate electrode have the same potential. In addition, the semiconductor layer 856 is positioned between the gate electrode and the back gate electrode.

The length of each of the gate electrode and the back gate electrode in the channel width direction is longer than the length of the semiconductor layer 856 in the channel width direction. In the channel width direction, the whole of the semiconductor layer 856 is covered with the gate electrode and the back gate electrode with the insulating layers 852, 855, 853, and 854 positioned therebetween.

In this structure, the semiconductor layer 856 included in the transistor can be electrically surrounded by electric fields of the gate electrode and the back gate electrode.

The transistor device structure in which the semiconductor layer 856 in which the channel formation region is formed is electrically surrounded by electric fields of the gate electrode and the back gate electrode, as in the transistor 821 or the transistor 826, can be referred to as a Surrounded channel (S-channel) structure.

With the S-channel structure, an electric field for inducing a channel can be effectively applied to the semiconductor layer 856 by one or both of the gate electrode and the back gate electrode, which enables the transistor to have an improved current drive capability and high on-state current characteristics. In addition, the transistor can be miniaturized because the on-state current can be increased. The S-channel structure can also increase the mechanical strength of the transistor.

<<Top-Gate Transistor>>

A transistor 842 illustrated in FIG. 13(A1) is a type of top-gate transistor. The transistor 842 is different from the transistor 810 and the transistor 820 in that the electrode 857*a* and the electrode 857*b* are formed after the insulating layer 854 is formed. The electrode 857*a* and the electrode 857*b* are electrically connected to the semiconductor layer 856 through opening portions formed in the insulating layer 853 and the insulating layer 854.

Part of the insulating layer 852 that does not overlap with the electrode 858 is removed, and an impurity is introduced into the semiconductor layer 856 using the electrode 858 and the remaining insulating layer 852 as masks, so that an impurity region can be formed in the semiconductor layer 856 in a self-aligned manner. The transistor 842 includes a region where the insulating layer 852 extends beyond end portions of the electrode 858. The semiconductor layer 856 in a region into which the impurity is introduced through the insulating layer 852 has a lower impurity concentration than the semiconductor layer 856 in a region into which the impurity is introduced not through the insulating layer 852. An LDD (Lightly Doped Drain) region is formed in the region of the semiconductor layer 856 that does not overlap with the electrode 858.

A transistor 843 illustrated in FIG. 13(A2) is different from the transistor 842 in that the electrode 850 is included. The transistor 843 includes the electrode 850 that is formed over the substrate 860. The electrode 850 includes a region overlapping with the semiconductor layer 856 with the insulating layer 861 therebetween. The electrode 850 can function as a back gate electrode.

As in a transistor 844 illustrated in FIG. 13(B1) and a transistor 845 illustrated in FIG. 13(B2), the insulating layer 852 in a region that does not overlap with the electrode 858 may be completely removed. Alternatively, as in a transistor 846 illustrated in FIG. 13(C1) and a transistor 847 illustrated in FIG. 13(C2), the insulating layer 852 may be left.

Also in the transistor 842 to the transistor 847, after the formation of the electrode 858, the impurity is introduced into the semiconductor layer 856 using the electrode 858 as a mask, so that an impurity region can be formed in the semiconductor layer 856 in a self-aligned manner.

According to one embodiment of the present invention, a transistor with favorable electrical characteristics can be provided. Furthermore, according to one embodiment of the present invention, a semiconductor device having a high degree of integration can be provided.

FIGS. 14(A1) to 14(C2) are cross-sectional views of the transistors 842, 843, 844, 845, 846, and 847, respectively, in the channel width direction.

The transistor 843, the transistor 845, and the transistor 847 each have the above-described S-channel structure. However, one embodiment of the present invention is not limited to this, and the transistor 843, the transistor 845, and the transistor 847 do not necessarily have the S-channel structure.

This embodiment can be implemented in appropriate combination with any of the other embodiments.

Embodiment 3

In this embodiment, examples of electronic devices each including the semiconductor device, the display device, and/or the memory device described in the above embodiment are described.

In this embodiment, electronic devices each including a display device fabricated using one embodiment of the present invention are described.

Figure 15A:
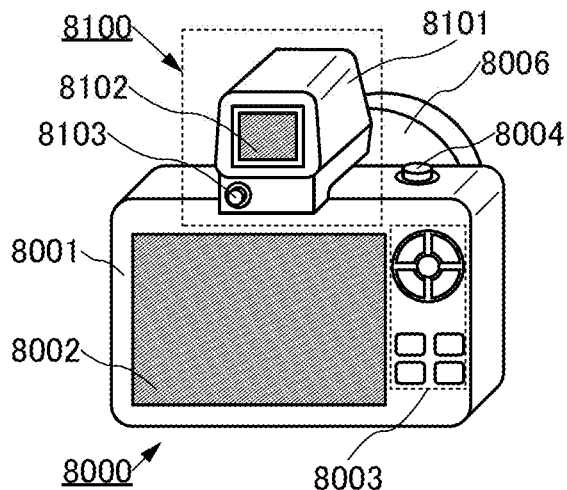
FIGS. 15A-15E are perspective views illustrating examples of electronic devices.

FIG. 15(A) is an external view of a camera 8000 to which a finder 8100 is attached.

The camera 8000 includes a housing 8001, a display portion 8002, operation buttons 8003, a shutter button 8004, and the like. A detachable lens 8006 is attached to the camera 8000.

Although the lens 8006 of the camera 8000 here is detachable from the housing 8001 for replacement, the lens 8006 may be incorporated in the housing.

The camera 8000 can take images at the press of the shutter button 8004. The display portion 8002 functions as a touch panel and images can also be taken at the touch of the display portion 8002.

The housing 8001 of the camera 8000 includes a mount including an electrode, so that the finder 8100, a stroboscope, or the like can be connected to the housing.

The finder 8100 includes a housing 8101, a display portion 8102, a button 8103, and the like.

The housing 8101 includes a mount for engagement with the mount of the camera 8000 so that the finder 8100 can be attached to the camera 8000. The mount includes an electrode, and a video or the like received from the camera 8000 through the electrode can be displayed on the display portion 8102.

The button 8103 functions as a power button. The on/off state of the display portion 8102 can be switched with the button 8103.

The display device of one embodiment of the present invention can be used in the display portion 8002 of the camera 8000 and the display portion 8102 of the finder 8100.

Note that although the camera 8000 and the finder 8100 are separate and detachable electronic devices in FIG. 15(A), a finder including a display device may be incorporated in the housing 8001 of the camera 8000.

Figure 15B:
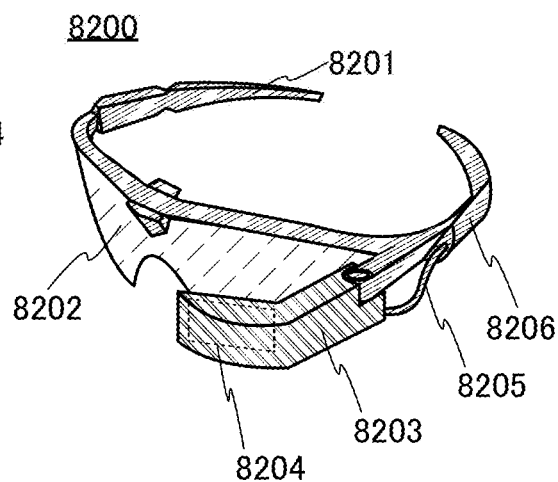

FIG. 15(B) is an external view of a head-mounted display 8200.

The head-mounted display 8200 includes a mounting portion 8201, a lens 8202, a main body 8203, a display portion 8204, a cable 8205, and the like. A battery 8206 is incorporated in the mounting portion 8201.

The cable 8205 supplies electric power from the battery 8206 to the main body 8203. The main body 8203 includes a wireless receiver or the like and can display received video information, such as display data, on the display portion 8204. The movement of the eyeball and the eyelid of a user is captured by a camera provided in the main body 8203 and then coordinates of the sight line of the user are calculated using the information to utilize the sight line of the user as an input means.

A plurality of electrodes may be provided in the mounting portion 8201 at a position in contact with the user. The main body 8203 may have a function of sensing current flowing through the electrodes with the movement of the user's eyeball to recognize the user's sight line. The main body 8203 may have a function of sensing current flowing through the electrodes to monitor the user's pulse. The mounting portion 8201 may include various sensors such as a temperature sensor, a pressure sensor, and an acceleration sensor to have a function of displaying the user's biological information on the display portion 8204. The main body 8203 may sense the movement of the user's head or the like to change a video displayed on the display portion 8204 in synchronization with the movement.

The display device of one embodiment of the present invention can be used in the display portion 8204.

Figure 15C:
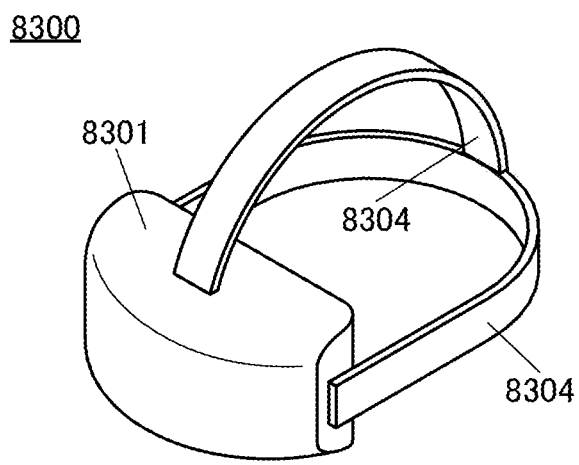
Figure 15D:
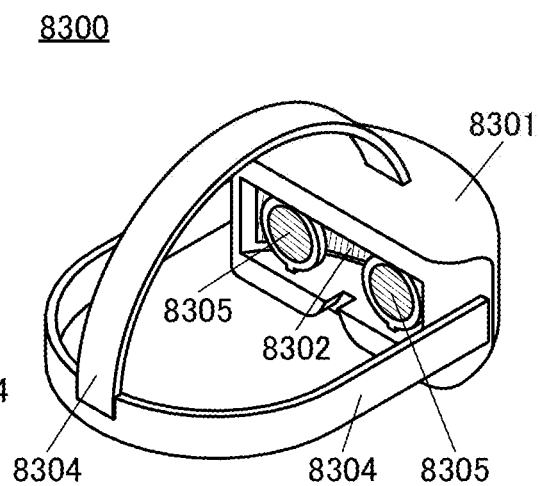
Figure 15E:
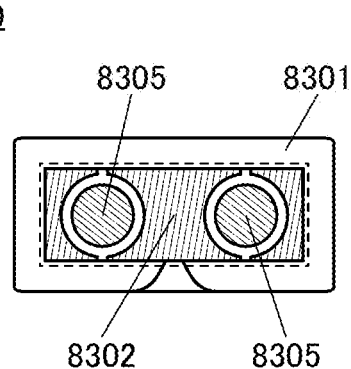

FIGS. 15(C), 15(D), and 15(E) are external views of a head-mounted display 8300. The head-mounted display 8300 includes a housing 8301, a display portion 8302, a band-shaped fixing unit 8304, and a pair of lenses 8305.

A user can see display on the display portion 8302 through the lenses 8305. Note that it is suitable that the display portion 8302 be curved and placed. When the display portion 8302 is curved and placed, a user can feel a high realistic sensation. Note that although the structure in which one display portion 8302 is provided is described in this embodiment as an example, the structure is not limited thereto, and two display portions 8302 may be provided. In that case, one display portion is placed for one eye of the user, so that three-dimensional display using parallax or the like is possible.

Note that the display device of one embodiment of the present invention can be used in the display portion 8302. The display device including the semiconductor device of one embodiment of the present invention has an extremely high resolution; thus, even when a video is magnified by the lenses 8305 as in FIG. 15(E), the user does not perceive pixels, and a more realistic video can be displayed.

Next, FIG. 16(A) to FIG. 16(G) illustrate examples of electronic devices that are different from the electronic devices illustrated in FIG. 15(A) to FIG. 15(E).

Electronic devices illustrated in FIG. 16(A) to FIG. 16(G) include a housing 9000, a display portion 9001, a speaker 9003, an operation key 9005 (including a power switch or an operation switch), a connection terminal 9006, a sensor 9007 (having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared ray), a microphone 9008, and the like.

The electronic devices illustrated in FIG. 16(A) to FIG. 16(G) have a variety of functions. Examples include a function of displaying a variety of information (a still image, a moving image, a text image, and the like) on the display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading out a program or data stored in a memory medium and displaying it on the display portion. Note that functions of the electronic devices illustrated in FIG. 16(A) to FIG. 16(G) are not limited thereto, and the electronic devices can have a variety of functions. Although not illustrated in FIG. 16(A) to FIG. 16(G), the electronic devices may each include a plurality of display portions. The electronic devices may each include a camera and the like and have a function of taking a still image, a function of taking a moving image, a function of storing the taken image in a memory medium (external or incorporated in the camera), a function of displaying the taken image on the display portion, or the like.

The details of the electronic devices illustrated in FIG. 16(A) to FIG. 16(G) are described below.

Figure 16A:
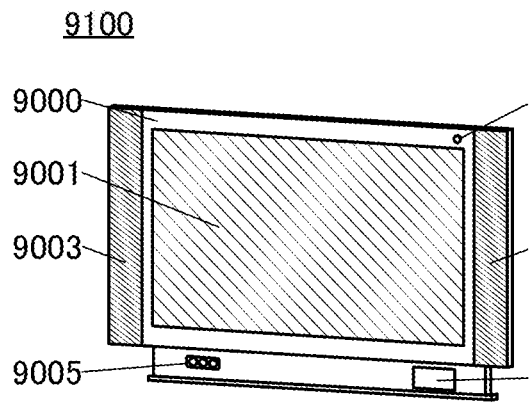
FIGS. 16A-16G are perspective views illustrating examples of electronic devices.

FIG. 16(A) is a perspective view illustrating a television device 9100. The television device 9100 can include the display portion 9001 having a large screen size of, for example, 50 inches or more, or 100 inches or more.

Figure 16D:
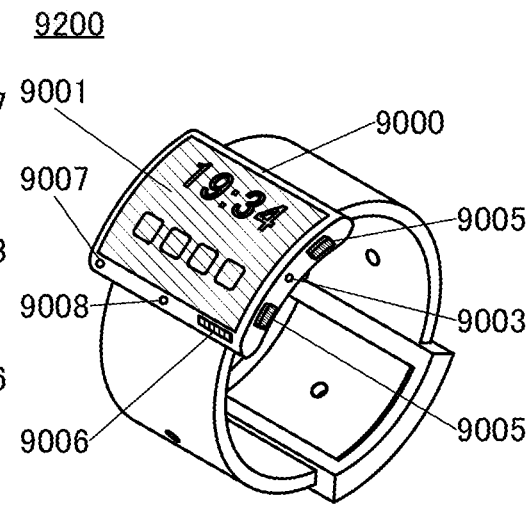
Figure 16B:
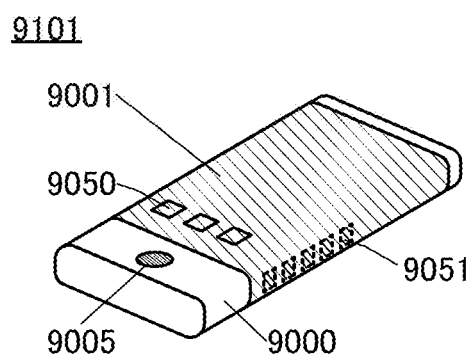

FIG. 16(B) is a perspective view illustrating a portable information terminal 9101. The portable information terminal 9101 functions as, for example, one or more selected from a telephone set, a notebook, an information browsing device, and the like. Specifically, the portable information terminal 9101 can be used as a smartphone. Note that the speaker 9003, the connection terminal 9006, the sensor 9007, or the like may be provided in the portable information terminal 9101. The portable information terminal 9101 can display characters and image information on its plurality of surfaces. For example, three operation buttons 9050 (also referred to as operation icons, or simply as icons) can be displayed on one surface of the display portion 9001. Information 9051 indicated by dashed rectangles can be displayed on another surface of the display portion 9001. Note that examples of the information 9051 include display indicating reception of an e-mail, an SNS (social networking service), a telephone call, and the like, the title of an e-mail, an SNS, or the like, the sender of an e-mail, an SNS, or the like, date, time, remaining battery, and reception strength of an antenna. Alternatively, the operation buttons 9050 or the like may be displayed on the position where the information 9051 is displayed, in place of the information 9051.

Figure 16E:
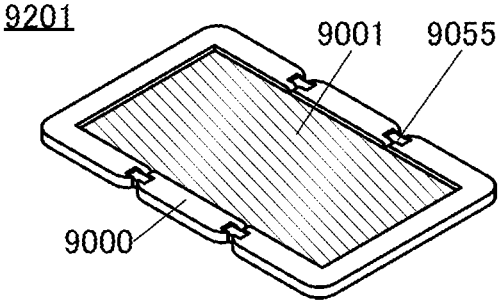
Figure 16C:
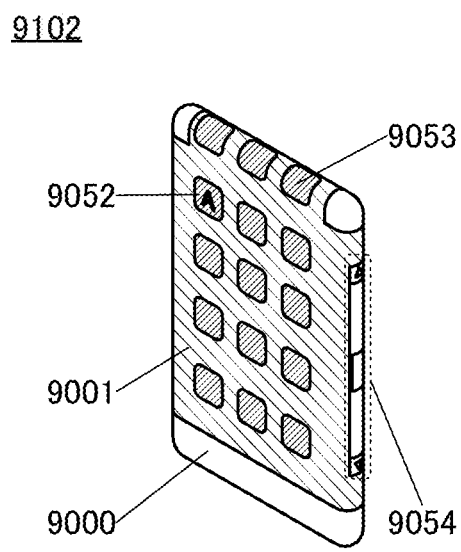

FIG. 16(C) is a perspective view illustrating a portable information terminal 9102. The portable information terminal 9102 has a function of displaying information on three or more surfaces of the display portion 9001. Here, an example in which information 9052, information 9053, and information 9054 are displayed on different surfaces is shown. For example, a user of the portable information terminal 9102 can see the display (here, the information 9053) with the portable information terminal 9102 put in a breast pocket of the clothes. Specifically, a caller's phone number, name, or the like of an incoming call is displayed in a position that can be seen from above the portable information terminal 9102. The user can see the display without taking out the portable information terminal 9102 from the pocket and decide whether to answer the call.

FIG. 16(D) is a perspective view illustrating a watch-type portable information terminal 9200. The portable information terminal 9200 is capable of executing a variety of applications such as mobile phone calls, e-mailing, reading and editing texts, music reproduction, Internet communication, and computer games. The display surface of the display portion 9001 is curved and provided, and display can be performed along the curved display surface. The portable information terminal 9200 can execute near field communication conformable to a communication standard. For example, hands-free calling can be achieved by mutual communication with a headset capable of wireless communication. The portable information terminal 9200 includes the connection terminal 9006, and data can be directly transmitted to and received from another information terminal via a connector. Power charging through the connection terminal 9006 is also possible. Note that the charging operation may be performed by wireless power feeding without using the connection terminal 9006.

Figure 16F:
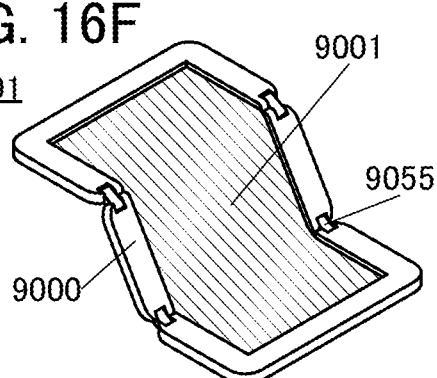
Figure 16G:
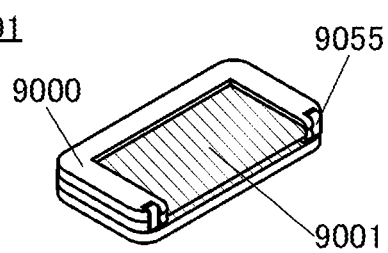

FIGS. 16(E), 16(F), and 16(G) are perspective views illustrating a foldable portable information terminal 9201. FIG. 16(E) is a perspective view of the portable information terminal 9201 in the opened state, FIG. 16(F) is a perspective view of the portable information terminal 9201 that is shifted from one of the opened state and the folded state to the other, and FIG. 16(G) is a perspective view of the portable information terminal 9201 in the folded state. The portable information terminal 9201 is highly portable in the folded state and is highly browsable in the opened state because of a seamless large display region. The display portion 9001 of the portable information terminal 9201 is supported by three housings 9000 joined by hinges 9055. By being folded at the hinges 9055 between two housings 9000, the portable information terminal 9201 can be reversibly changed in shape from the opened state to the folded state. For example, the portable information terminal 9201 can be bent with a radius of curvature of greater than or equal to 1 mm and less than or equal to 150 mm.

The electronic devices described in this embodiment include the display portion for displaying some sort of information. Note that the semiconductor device of one embodiment of the present invention can also be used for an electronic device that does not include a display portion.

At least part of the structure examples, the drawings corresponding thereto, and the like described in this embodiment can be implemented in combination with the other structure examples, the other drawings, and the like as appropriate.

At least part of this embodiment can be implemented in combination with the other embodiments described in this specification as appropriate.

Embodiment 4

In this embodiment, electronic devices of one embodiment of the present invention are described with reference to drawings.

Electronic devices exemplified below include a display device of one embodiment of the present invention in a display portion. Thus, the electronic devices achieve high resolution. In addition, the electronic devices can achieve both high resolution and a large screen.

The display portion of the electronic device of one embodiment of the present invention can display a video with a resolution of, for example, full high definition, 4K2K, 8K4K, 16K8K, or more. In addition, as a screen size of the display portion, the diagonal can be greater than or equal to 20 inches, greater than or equal to 30 inches, greater than or equal to 50 inches, greater than or equal to 60 inches, or greater than or equal to 70 inches.

Examples of the electronic devices include a digital camera, a digital video camera, a digital photo frame, a mobile phone, a portable game machine, a portable information terminal, and an audio reproducing device, in addition to electronic devices with a relatively large screen, such as a television device, a desktop or laptop personal computer, a monitor of a computer or the like, digital signage, and a large game machine such as a pachinko machine.

The electronic device of one embodiment of the present invention or a lighting device can be incorporated along a curved inside/outside wall surface of a house or a building or a curved interior/exterior surface of a car.

The electronic device of one embodiment of the present invention may include an antenna. When a signal is received by the antenna, the electronic device can display a video, information, or the like on a display portion. In addition, when the electronic device includes the antenna and a secondary battery, the antenna may be used for contactless power transmission.

The electronic device of one embodiment of the present invention may include a sensor (having a function of measuring force, displacement, position, speed, acceleration, angular velocity, rotational frequency, distance, light, liquid, magnetism, temperature, a chemical substance, sound, time, hardness, electric field, current, voltage, electric power, radioactive rays, flow rate, humidity, gradient, oscillation, odor, or infrared rays).

The electronic device of one embodiment of the present invention can have a variety of functions. For example, the electronic device can have a function of displaying a variety of information (a still image, a moving image, a text image, and the like) on the display portion, a touch panel function, a function of displaying a calendar, date, time, and the like, a function of executing a variety of software (programs), a wireless communication function, and a function of reading out a program or data stored in a recording medium.

Figure 17A:
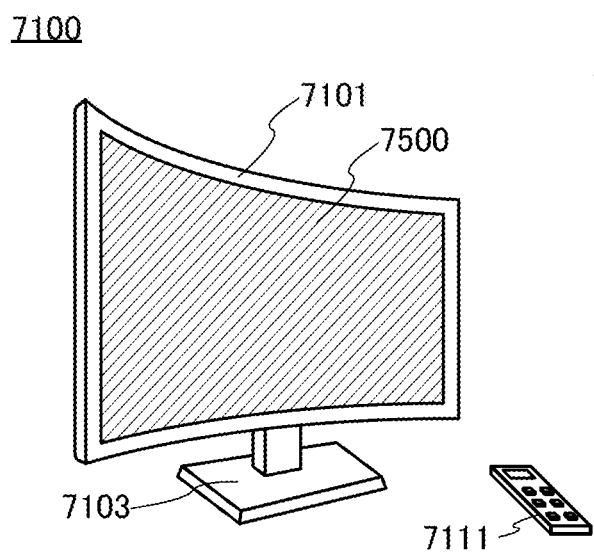
FIGS. 17A-17D are perspective views illustrating examples of electronic devices.

FIG. 17(A) illustrates an example of a television device. In a television device 7100, a display portion 7500 is incorporated in a housing 7101. Here, a structure in which the housing 7101 is supported by a stand 7103 is illustrated.

The display device of one embodiment of the present invention can be used for the display portion 7500.

Operation of the television device 7100 illustrated in FIG. 17(A) can be performed with an operation switch provided in the housing 7101 or a separate remote controller 7111. Alternatively, the display portion 7500 may include a touch sensor, and the television device 7100 may be operated by touch on the display portion 7500 with a finger or the like. The remote controller 7111 may be provided with a display portion for displaying information output from the remote controller 7111. With operation keys or a touch panel provided in the remote controller 7111, channels and volume can be operated and videos displayed on the display portion 7500 can be operated.

Note that the television device 7100 has a structure in which a receiver, a modem, and the like are provided. A general television broadcast can be received with the receiver. In addition, when the television device is connected to a communication network with or without wires via the modem, one-way (from a sender to a receiver) or two-way (between a sender and a receiver or between receivers) data communication can be performed.

Figure 17B:
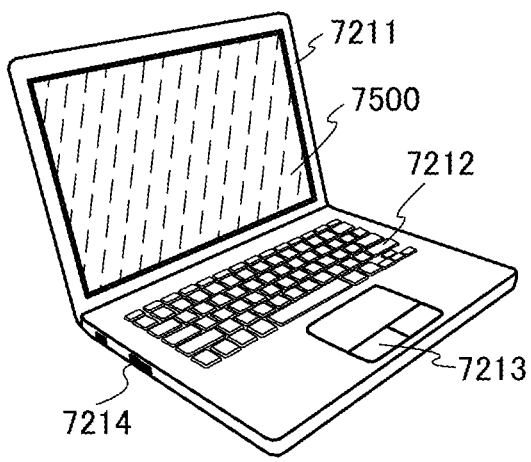

FIG. 17(B) illustrates a laptop personal computer 7200. The laptop personal computer 7200 includes a housing 7211, a keyboard 7212, a pointing device 7213, an external connection port 7214, and the like. In the housing 7211, the display portion 7500 is incorporated.

The display device of one embodiment of the present invention can be used for the display portion 7500.

Figure 17C:
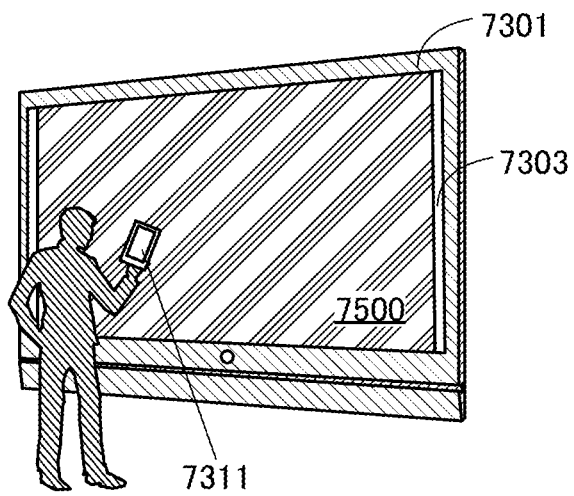
Figure 17D:
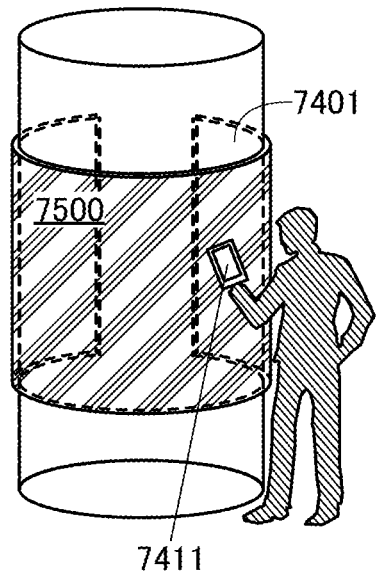

FIGS. 17(C) and 17(D) illustrate examples of digital signage.

Digital signage 7300 illustrated in FIG. 17(C) includes a housing 7301, the display portion 7500, a speaker 7303, and the like. Furthermore, the digital signage can include an LED lamp, operation keys (including a power switch or an operation switch), a connection terminal, a variety of sensors, a microphone, and the like.

FIG. 17(D) is digital signage 7400 attached to a cylindrical pillar 7401. The digital signage 7400 includes the display portion 7500 provided along a curved surface of the pillar 7401.

The display device of one embodiment of the present invention can be used for the display portion 7500 in FIGS. 17(C) and 17(D).

A larger area of the display portion 7500 can increase the amount of information that can be provided at a time. In addition, the larger display portion 7500 attracts more attention, so that the effectiveness of the advertisement can be increased, for example.

It is preferable to use a touch panel for the display portion 7500 because in addition to display of a still image or a moving image on the display portion 7500, intuitive operation by a user is possible. Moreover, for an application for providing information such as route information or traffic information, usability can be enhanced by intuitive operation.

Furthermore, as illustrated in FIGS. 17(C) and 17(D), it is preferable that the digital signage 7300 or the digital signage 7400 work with an information terminal 7311 or an information terminal 7411 such as a user's smartphone through wireless communication. For example, information of an advertisement displayed on the display portion 7500 can be displayed on a screen of the information terminal 7311 or the information terminal 7411. Moreover, by operation of the information terminal 7311 or the information terminal 7411, a displayed image on the display portion 7500 can be switched.

Furthermore, it is possible to make the digital signage 7300 or the digital signage 7400 execute a game with the use of the screen of the information terminal 7311 or the information terminal 7411 as an operation means (controller). Thus, an unspecified number of users can join in and enjoy the game concurrently.

At least part of this embodiment can be implemented in combination with the other embodiments described in this specification as appropriate.

Embodiment 5

Described in this embodiment is the composition of a CAC (Cloud-Aligned Composite)-OS applicable to the OS transistor described in the above embodiments.

The CAC-OS has, for example, a composition in which elements included in a metal oxide are unevenly distributed. Materials including unevenly distributed elements each have a size of greater than or equal to 0.5 nm and less than or equal to 10 nm, preferably greater than or equal to 1 nm and less than or equal to 2 nm, or a similar size. Note that in the following description of a metal oxide, a state in which one or more metal elements are unevenly distributed and regions including the metal element(s) are mixed is referred to as a mosaic pattern or a patch-like pattern. The regions each have a size of greater than or equal to 0.5 nm and less than or equal to 10 nm, preferably greater than or equal to 1 nm and less than or equal to 2 nm, or a similar size.

Note that a metal oxide preferably contains at least indium. In particular, indium and zinc are preferably contained. In addition, one kind or a plurality of kinds selected from aluminum, gallium, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like may be contained.

For instance, a CAC-OS in an In—Ga—Zn oxide (an In—Ga—Zn oxide in the CAC-OS may be particularly referred to as CAC-IGZO) has a composition in which materials are separated into indium oxide (hereinafter, $InO_{X1}$ (X1 is a real number greater than 0)) or indium zinc oxide (hereinafter, $In_{X2}Zn_{Y2}O_{Z2}$ (X2, Y2, and Z2 are real numbers greater than 0)) and gallium oxide (hereinafter, $GaO_{X3}$ (X3 is a real number greater than 0)) or gallium zinc oxide (hereinafter, $Ga_{X4}Zn_{Y4}O_{Z4}$ (X4, Y4, and Z4 are real numbers greater than 0)), for example, so that a mosaic pattern is formed, and mosaic-like $InO_{X1}$ or $In_{X2}Zn_{Y2}O_{Z2}$ is evenly distributed in the film (which is hereinafter also referred to as cloud-like).

That is, the CAC-OS is a composite metal oxide with a composition in which a region including $GaO_{X3}$ as a main component and a region including $In_{X2}Zn_{Y2}O_{Z2}$ or $InO_{X1}$ as a main component are mixed. Note that in this specification, for example, when the atomic ratio of In to an element M in a first region is greater than the atomic ratio of In to an element M in a second region, the first region has higher In concentration than the second region.

Note that IGZO is a common name, which may specify a compound containing In, Ga, Zn, and O. Typical examples of IGZO include a crystalline compound represented by $InGaO_3(ZnO)_{m1}$ (m1 is a natural number) and a crystalline compound represented by $In_{(1+x0)}Ga_{(1-x0)}O_3(ZnO)_{m0}$ ($-1 \leq x0 \leq 1$; m0 is a given number).

The above crystalline compounds have a single crystal structure, a polycrystalline structure, or a CAAC structure. Note that the CAAC structure is a crystal structure in which a plurality of IGZO nanocrystals have c-axis alignment and are connected in the a-b plane direction without alignment.

On the other hand, the CAC-OS relates to the material composition of a metal oxide. In a material composition of a CAC-OS including In, Ga, Zn, and O, nanoparticle regions including Ga as a main component are observed in part of the CAC-OS and nanoparticle regions including In as a main component are observed in part thereof. These nanoparticle regions are randomly dispersed to form a mosaic pattern. Therefore, the crystal structure is a secondary element for the CAC-OS.

Note that in the CAC-OS, a stacked-layer structure including two or more films with different atomic ratios is not included. For example, a two-layer structure of a film including In as a main component and a film including Ga as a main component is not included.

A boundary between the region including $GaO_{X3}$ as a main component and the region including $In_{X2}Zn_{Y2}O_{Z2}$ or $InO_{X1}$ as a main component is difficult to clearly observe in some cases.

Note that in the case where one kind or a plurality of kinds selected from aluminum, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like are contained instead of gallium, the CAC-OS refers to a composition in which some regions that include the metal element(s) as a main component and are observed as nanoparticles and some regions that include In as a main component and are observed as nanoparticles are randomly dispersed in a mosaic pattern.

The CAC-OS can be formed by a sputtering method under conditions where a substrate is not heated, for example. In the case of forming the CAC-OS by a sputtering method, one or more selected from an inert gas (typically, argon), an oxygen gas, and a nitrogen gas may be used as a deposition gas. The ratio of the flow rate of an oxygen gas to the total flow rate of the deposition gas at the time of deposition is preferably as low as possible, and for example, the flow ratio of an oxygen gas is preferably higher than or equal to 0% and lower than 30%, further preferably higher than or equal to 0% and lower than or equal to 10%.

The CAC-OS is characterized in that no clear peak is observed in measurement using θ/2θ scan by an Out-of-plane method, which is an X-ray diffraction (XRD) measurement method. That is, it is found from the X-ray diffraction measurement that no alignment in the a-b plane direction and the c-axis direction is observed in the measured region.

In an electron diffraction pattern of the CAC-OS that is obtained by irradiation with an electron beam with a probe diameter of 1 nm (also referred to as a nanometer-sized electron beam), a ring-like region with high luminance (a ring region) and a plurality of bright spots in the ring region are observed. Therefore, the electron diffraction pattern indicates that the crystal structure of the CAC-OS includes an nc (nano-crystal) structure with no alignment in the plan-view direction and the cross-sectional direction.

Moreover, for example, it can be confirmed by EDX mapping obtained using energy dispersive X-ray spectroscopy (EDX) that the CAC-OS in the In—Ga—Zn oxide has a composition in which regions including $GaO_{X3}$ as a main component and regions including $In_{X2}Zn_{Y2}O_{Z2}$ or $InO_{X1}$ as a main component are unevenly distributed and mixed.

The CAC-OS has a structure different from that of an IGZO compound in which metal elements are evenly distributed, and has characteristics different from those of the IGZO compound. That is, in the CAC-OS, regions including $GaO_{X3}$ or the like as a main component and regions including $In_{X2}Zn_{Y2}O_{Z2}$ or $InO_{X1}$ as a main component are phase-separated from each other and form a mosaic pattern.

The conductivity of a region including $In_{X2}Zn_{Y2}O_{Z2}$ or $InO_{X1}$ as a main component is higher than that of a region including $GaO_{X3}$ or the like as a main component. In other words, when carriers flow through regions including $In_{X2}Zn_{Y2}O_{Z2}$ or $InO_{X1}$ as a main component, the conductivity of a metal oxide is exhibited. Accordingly, when regions including $In_{X2}Zn_{Y2}O_{Z2}$ or $InO_{X1}$ as a main component are distributed in a metal oxide like a cloud, high field-effect mobility (μ) can be achieved.

By contrast, the insulating property of a region including $GaO_{X3}$ or the like as a main component is higher than that of a region including $In_{X2}Zn_{Y2}O_{Z2}$ or $InO_{X1}$ as a main component. In other words, when regions including $GaO_{X3}$ or the like as a main component are distributed in a metal oxide, leakage current can be suppressed and favorable switching operation can be achieved.

Accordingly, when a CAC-OS is used for a semiconductor element, the insulating property derived from $GaO_{X3}$ or the like and the conductivity derived from $In_{X2}Zn_{Y2}O_{Z2}$ or $InO_{X1}$ complement each other, whereby a high on-state current ($I_{on}$) and high field-effect mobility (μ) can be achieved.

A semiconductor element including a CAC-OS has high reliability. Thus, the CAC-OS is suitably used in a variety of semiconductor devices typified by a display.

This embodiment can be implemented in appropriate combination with any of the other embodiments.

Unless otherwise specified, an on-state current in this specification refers to a drain current of a transistor in an on state. Unless otherwise specified, the on state (sometimes abbreviated as on) refers to a state where the voltage between its gate and source ($V_G$) is higher than or equal to the threshold voltage ($V_{th}$) in an n-channel transistor, and a state where $V_G$ is lower than or equal to $V_{th}$ in a p-channel transistor. For example, the on-state current of an n-channel transistor refers to a drain current when $V_G$ is higher than or equal to $V_{th}$. Furthermore, the on-state current of a transistor depends on a voltage between a drain and a source ($V_D$) in some cases.

Unless otherwise specified, an off-state current in this specification refers to a drain current of a transistor in an off state. Unless otherwise specified, the off state (sometimes abbreviated as off) refers to a state where $V_G$ is lower than $V_{th}$ in an n-channel transistor, and a state where $V_G$ is higher than $V_{th}$ in a p-channel transistor. For example, the off-state current of an n-channel transistor refers to a drain current when $V_G$ is lower than $V_{th}$. The off-state current of a transistor depends on $V_G$ in some cases. Thus, "the off-state current of a transistor is lower than $10^{-21}$ A" may mean that there is $V_G$ at which the off-state current of the transistor is lower than $10^{-21}$ A.

Furthermore, the off-state current of a transistor depends on $V_D$ in some cases. Unless otherwise specified, the off-state current in this specification may refer to an off-state current at $V_D$ with an absolute value of 0.1 V, 0.8 V, 1 V, 1.2 V, 1.8 V, 2.5 V, 3 V, 3.3 V, 10 V, 12 V, 16 V, or 20 V. Alternatively, the off-state current may refer to an off-state current at $V_D$ used in a semiconductor device or the like including the transistor.

Note that a voltage refers to a potential difference between two points, and a potential refers to electrostatic energy (electric potential energy) of a unit charge at a given point in an electrostatic field. Note that in general, a potential difference between a potential of one point and a reference potential (e.g., a ground potential) is simply called a potential or a voltage, and a potential and a voltage are used as synonymous words in many cases. Therefore, in this specification, a potential may be rephrased as a voltage and a voltage may be rephrased as a potential unless otherwise specified.

In this specification and the like, when there is a description which explicitly states that X and Y are connected, the case where X and Y are electrically connected and the case where X and Y are directly connected are regarded as being disclosed in this specification and the like.

Here, X and Y each denote an object (e.g., a device, an element, a circuit, a wiring, an electrode, a terminal, a conductive film, or a layer).

An example of the case where X and Y are directly connected is the case where X and Y are connected without an element that enables electrical connection between X and Y (e.g., a switch, a transistor, a capacitor, an inductor, a resistor, a diode, a display element, a light-emitting element, or a load).

An example of the case where X and Y are electrically connected is the case where at least one element that enables electrical connection between X and Y (e.g., a switch, a transistor, a capacitor, an inductor, a resistor, a diode, a display element, a light-emitting element, or a load) can be connected between X and Y. Note that a switch has a function of controlling whether current flows or not by being in a conduction state (an on state) or a non-conduction state (an off state). Alternatively, the switch has a function of selecting and changing a current path. Note that the case where X and Y are electrically connected includes the case where X and Y are directly connected.

REFERENCE NUMERALS

11: transistor, 11a: transistor, 12: transistor, 12a: transistor, 13: transistor, 13a: transistor, 14: circuit, 14a: input terminal, 14b: capacitor, 14c: liquid crystal element, 14d: transistor, 14e: light-emitting element, 14f: transistor, 15: capacitor, 16: transistor, 17: capacitor, 20: display device, 20A: display device, 21: display portion, 21a: display region, 21b: display region, 21c: region, 22: gate driver, 23: gate driver, 24: source driver, 24a: digital-analog converter circuit, 24b: buffer circuit, 25a: gate driver, 25b: gate driver, 31: wiring, 31a: wiring, 31b: wiring, 31c: wiring, 32: wiring, 32a: wiring, 32b: wiring, 32c: wiring, 33a: wiring, 33b: wiring, 34a: wiring, 34b: wiring, 34c: wiring.

This application is based on Japanese Patent Application Serial No. 2018-067709 filed with Japan Patent Office on Mar. 30, 2018, the entire contents of which are hereby incorporated herein by reference.

The invention claimed is:

1. A method for driving a display device comprising a first pixel, a second pixel, a scan line, a first wiring, and a second wiring,
    wherein a first period to a third period are included,
    wherein the first pixel and the second pixel are configured to be supplied with different display data,
    wherein setting data supplied to the first pixel and the second pixel is configured to set a state where the display data of the first pixel and the second pixel is updated or a state where the display data is not updated,
    wherein the scan line is electrically connected to the first pixel and the second pixel,
    wherein the first wiring is electrically connected to the first pixel,
    wherein the second wiring is electrically connected to the second pixel,
    wherein, in the first period, a signal for selecting the first pixel and the second pixel is supplied to the scan line, the setting data for setting the state where the display data of the first pixel is updated is supplied to the first wiring, and the setting data for setting the state where the display data of the second pixel is updated is supplied to the second wiring,
    wherein, in the second period, a signal for selecting the first pixel and the second pixel is supplied to the scan line, the setting data for setting the state where the display data of the first pixel is not updated is supplied to the first wiring, and the setting data for setting the state where the display data of the second pixel is updated is supplied to the second wiring, and
    wherein, in the third period, a signal for deselecting the first pixel and the second pixel is supplied to the scan line, first display data is displayed in the first pixel, and second display data is displayed in the second pixel.

2. The method for driving a display device, according to claim 1,
    wherein the pixel comprises a capacitor for holding the setting data and a transistor, wherein the setting data supplied to the capacitor is configured to set the state where the display data of the pixel is updated or the state where the display data of the pixel is not updated, wherein the setting data supplied to the capacitor controls an on/off state of the transistor, wherein the display data is updated through the transistor when the setting data for setting the state where the display data is updated is supplied to the capacitor, and wherein the display data is not updated through the transistor when the setting data for setting the state where the display data is not updated is supplied to the capacitor.

3. A display device comprising a plurality of pixels, a plurality of scan lines, and a plurality of signal lines, a source driver, and a gate driver, wherein the signal lines each comprise a first wiring and a second wiring, wherein the scan lines each comprise a third wiring and a fourth wiring, wherein the pixels each comprise a first transistor, a second transistor, a third transistor, a first capacitor, and a first circuit, wherein the first circuit comprises an input terminal, wherein a gate of the first transistor is electrically connected to the third wiring, wherein one of a source and a drain of the first transistor is electrically connected to the first wiring, wherein the other of the source and the drain of the first transistor is electrically connected to one of a source and a drain of the second transistor, wherein the other of the source and the drain of the second transistor is electrically connected to the input terminal, wherein one of a source and a drain of the third transistor is electrically connected to the second wiring, wherein the other of the source and the drain of the third transistor is electrically connected to a gate of the second transistor and one electrode of the first capacitor, wherein a gate of the third transistor is electrically connected to the fourth wiring wherein the other of the source and the drain of the first transistor is not connected to the gate of the second transistor, and wherein the third wiring and the fourth wiring are electrically connected to different portions of the gate driver.

4. The display device according to claim 3, wherein the first circuit comprises a second capacitor and a liquid crystal element, and wherein the input terminal of the first circuit is electrically connected to one electrode of the second capacitor and the liquid crystal element.

5. The display device according to claim 3, wherein the first circuit comprises a third capacitor, a fourth transistor, and a light-emitting element, wherein the input terminal of the first circuit is electrically connected to one electrode of the third capacitor and a gate of the fourth transistor, and wherein one of a source and a drain of the fourth transistor is electrically connected to the light-emitting element.

6. The display device according to claim 3, wherein the source driver is electrically connected to the plurality of signal lines, wherein the source driver is configured to select whether the first wiring is supplied with the display data or brought into a floating state, wherein the source driver is configured to supply the setting data to the second wiring, and wherein the source driver is configured to supply the display data to the plurality of signal lines at the same time.

7. The display device according to claim 3, wherein each of the pixels does not include within the pixel a transistor other than the first transistor, the second transistor and the third transistors external to the first circuit.

8. The display device according to claim 3, wherein the other of the source and the drain of the first transistor is directly connected to the one of the source and the drain of the second transistor.

* * * * *